(12) United States Patent
Nakamura et al.

(10) Patent No.: US 11,328,854 B2
(45) Date of Patent: May 10, 2022

(54) ELECTRONIC COMPONENT AND MANUFACTURING METHOD FOR ELECTRONIC COMPONENT

(71) Applicant: Murata Manufacturing Co., Ltd., Nagaokakyo (JP)

(72) Inventors: Sumiyo Nakamura, Nagaokakyo (JP); Jun Adachi, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 704 days.

(21) Appl. No.: 16/255,900

(22) Filed: Jan. 24, 2019

(65) Prior Publication Data
US 2019/0156988 A1 May 23, 2019

Related U.S. Application Data

(63) Continuation of application No. PCT/JP2017/027629, filed on Jul. 31, 2017.

(30) Foreign Application Priority Data

Sep. 30, 2016 (JP) .............................. JP2016-193888

(51) Int. Cl.
| | |
|---|---|
| *H01F 5/00* | (2006.01) |
| *H01F 27/28* | (2006.01) |
| *H01F 27/29* | (2006.01) |
| *H01F 27/34* | (2006.01) |
| *H01F 41/12* | (2006.01) |
| *H01F 27/32* | (2006.01) |
| *H01F 41/04* | (2006.01) |

(Continued)

(52) U.S. Cl.
CPC ......... *H01F 27/2804* (2013.01); *H01C 1/148* (2013.01); *H01C 7/12* (2013.01);
(Continued)

(58) Field of Classification Search
USPC .............................. 336/200, 232, 192, 198, 6
See application file for complete search history.

(56) References Cited

U.S. PATENT DOCUMENTS

| | | | |
|---|---|---|---|
| 2004/0021541 A1 | 2/2004 | Otsuka et al. | |
| 2009/0301764 A1 | 12/2009 | Kawamura et al. | |

(Continued)

FOREIGN PATENT DOCUMENTS

| | | |
|---|---|---|
| JP | 2001-155937 A | 6/2001 |
| JP | 2007-115852 A | 5/2007 |

(Continued)

OTHER PUBLICATIONS

Official Communication issued in International Patent Application No. PCT/JP2017/027629, dated Oct. 17, 2017.

*Primary Examiner* — Shawki S Ismail
*Assistant Examiner* — Kazi S Hossain
(74) *Attorney, Agent, or Firm* — Keating & Bennett, LLP

(57) ABSTRACT

An electronic component includes a ceramic element body including glass, and outer electrodes provided on the ceramic element body. Each of the outer electrodes includes a base electrode layer on the ceramic element body and a buffer portion to buffer an impact. The base electrode layer includes a first region that is disposed on the ceramic element body and includes the buffer portion of equal to or more than about 15 vol % and equal to or less than about 50 vol %, and a second region that covers the first region and includes the buffer portion of equal to or more than about 1 vol % and equal to or less than about 10 vol %.

8 Claims, 12 Drawing Sheets

(51) Int. Cl.
  *H01C 7/12* (2006.01)
  *H01C 1/148* (2006.01)
  *H01C 17/28* (2006.01)
  *H01F 17/00* (2006.01)

(52) U.S. Cl.
  CPC ......... *H01C 17/28* (2013.01); *H01F 17/0013* (2013.01); *H01F 27/29* (2013.01); *H01F 27/323* (2013.01); *H01F 27/34* (2013.01); *H01F 41/041* (2013.01); *H01F 41/122* (2013.01); *H01F 2027/2809* (2013.01)

(56) References Cited

U.S. PATENT DOCUMENTS

| | | | |
|---|---|---|---|
| 2011/0157767 A1* | 6/2011 | Hur | H01G 4/008 361/305 |
| 2014/0125448 A1 | 5/2014 | Tsuchida et al. | |
| 2014/0368307 A1 | 12/2014 | Kato | |
| 2015/0187500 A1* | 7/2015 | Kang | H01G 2/065 174/260 |
| 2017/0178811 A1* | 6/2017 | Chun | H01G 4/2325 |
| 2017/0294268 A1* | 10/2017 | Katsuta | H01G 4/012 |
| 2020/0168400 A1* | 5/2020 | Nakamoto | H01G 4/2325 |

FOREIGN PATENT DOCUMENTS

| | | |
|---|---|---|
| JP | 2012-033621 A | 2/2012 |
| JP | 2013-012688 A | 1/2013 |
| JP | 2014-082003 A | 5/2014 |
| JP | 2014-093483 A | 5/2014 |
| WO | 2009/113380 A1 | 9/2009 |
| WO | 2013/136936 A1 | 9/2013 |
| WO | 2014/103896 A1 | 7/2014 |

* cited by examiner

FIG.17
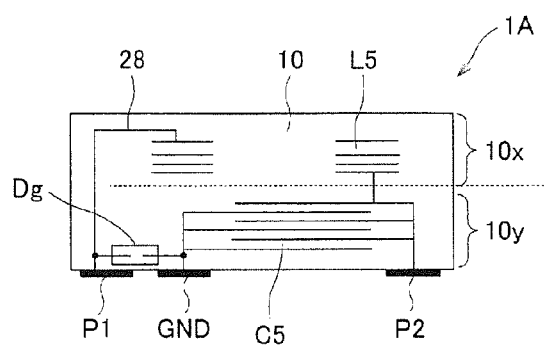
FIG.18
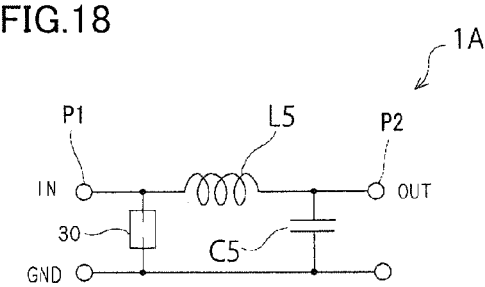
FIG.19
CONDUCTIVE PASTE COMPOSITION (vol%)
|  | P-1 | P-2 | P-3 | P-4 | P-5 | P-6 |
|---|---|---|---|---|---|---|
| COPPER POWDER | 11.0 | 11.0 | 11.0 | 11.0 | 11.0 | 11.0 |
| RESIN BEAD | - | 0.6 | 1.2 | 1.8 | 6.0 | 7.2 |
| VARNISH | 89.0 | 88.4 | 87.8 | 87.2 | 83.0 | 81.8 |
| TOTAL | 100.0 | 100.0 | 100.0 | 100.0 | 100.0 | 100.0 |

FIG.20

| WORKING EXAMPLE | FIRST REGION PASTE | SECOND REGION PASTE | FIRST REGION BUFFER PORTION AMOUNT (vol%) | SECOND REGION BUFFER PORTION AMOUNT (vol%) | FIRST REGION THICKNESS (μm) | SECOND REGION THICKNESS (μm) | DROP TEST RESULT | Ni PLATING DEPOSITION | JUDGMENT |
|---|---|---|---|---|---|---|---|---|---|
| K-1* | P-3 | P-2 | 10.0 | 5.0 | 20.0 | 5.0 | POOR | GOOD | POOR |
| K-2* | P-3 | P-3 | 10.0 | 10.0 | 20.0 | 5.0 | POOR | GOOD | POOR |
| K-3* | P-3 | P-4 | 10.0 | 15.0 | 20.0 | 5.0 | POOR | POOR | POOR |
| K-4* | P-4 | Cu PLATING | 15.0 | 0.0 | 20.0 | 5.0 | POOR | GOOD | POOR |
| K-5 | P-4 | P-1 | 15.0 | 1.0 | 20.0 | 5.0 | GOOD | GOOD | GOOD |
| K-6 | P-4 | P-3 | 15.0 | 10.0 | 20.0 | 5.0 | GOOD | GOOD | GOOD |
| K-7* | P-4 | P-4 | 15.0 | 15.0 | 20.0 | 5.0 | GOOD | POOR | POOR |
| K-8* | P-4 | P-5 | 15.0 | 50.0 | 20.0 | 5.0 | POOR | POOR | POOR |
| K-9* | P-5 | Cu PLATING | 50.0 | 0.0 | 20.0 | 5.0 | GOOD | GOOD | GOOD |
| K-10 | P-5 | P-1 | 50.0 | 1.0 | 20.0 | 5.0 | GOOD | GOOD | GOOD |
| K-11 | P-5 | P-2 | 50.0 | 5.0 | 20.0 | 5.0 | GOOD | GOOD | GOOD |
| K-12 | P-5 | P-3 | 50.0 | 10.0 | 20.0 | 5.0 | GOOD | GOOD | GOOD |
| K-13* | P-5 | P-4 | 50.0 | 15.0 | 20.0 | 5.0 | GOOD | POOR | POOR |
| K-14* | P-5 | P-5 | 50.0 | 50.0 | 20.0 | 5.0 | GOOD | POOR | POOR |
| K-15* | P-6 | Cu PLATING | 60.0 | 0.0 | 20.0 | 5.0 | POOR | GOOD | POOR |
| K-16* | P-6 | P-1 | 60.0 | 1.0 | 20.0 | 5.0 | POOR | GOOD | POOR |
| K-17* | P-6 | P-2 | 60.0 | 5.0 | 20.0 | 5.0 | POOR | GOOD | POOR |
| K-18* | P-6 | P-3 | 60.0 | 10.0 | 20.0 | 5.0 | POOR | GOOD | POOR |
| K-19* | P-6 | P-4 | 60.0 | 15.0 | 20.0 | 5.0 | POOR | POOR | POOR |
| K-20* | P-6 | P-6 | 60.0 | 60.0 | 20.0 | 5.0 | POOR | POOR | POOR |

*OUT OF SCOPE OF THE PRESENT INVENTION

FIG.21

| WORKING EXAMPLE | FIRST REGION PASTE | SECOND REGION PASTE | FIRST REGION BUFFER PORTION AMOUNT (vol%) | SECOND REGION BUFFER PORTION AMOUNT (vol%) | FIRST REGION THICKNESS (μm) | SECOND REGION THICKNESS (μm) | DROP TEST RESULT | Ni PLATING DEPOSITION | JUDGMENT |
|---|---|---|---|---|---|---|---|---|---|
| K-21 | P-5 | T BARREL | 50.0 | 3.0 | 3.0 | 0.5 | FAIR | FAIR | FAIR |
| K-22 | P-5 | T BARREL | 50.0 | 3.0 | 3.0 | 1.0 | FAIR | GOOD | FAIR |
| K-23 | P-5 | P-2 | 50.0 | 5.0 | 3.0 | 15.0 | FAIR | GOOD | FAIR |
| K-24 | P-5 | T BARREL | 50.0 | 3.0 | 5.0 | 0.5 | GOOD | FAIR | FAIR |
| K-25 | P-5 | T BARREL | 50.0 | 3.0 | 5.0 | 1.0 | GOOD | GOOD | GOOD |
| K-26 | P-5 | P-2 | 50.0 | 5.0 | 5.0 | 15.0 | GOOD | GOOD | GOOD |
| K-27 | P-5 | T BARREL | 50.0 | 3.0 | 40.0 | 0.5 | GOOD | FAIR | FAIR |
| K-28 | P-5 | T BARREL | 50.0 | 3.0 | 40.0 | 1.0 | GOOD | GOOD | GOOD |
| K-29 | P-5 | P-2 | 50.0 | 5.0 | 40.0 | 15.0 | GOOD | GOOD | GOOD |

ELECTRONIC COMPONENT AND MANUFACTURING METHOD FOR ELECTRONIC COMPONENT

CROSS REFERENCE TO RELATED APPLICATIONS

This application claims the benefit of priority to Japanese Patent Application No. 2016-193888 filed on Sep. 30, 2016 and is a Continuation Application of PCT Application No. PCT/JP2017/027629 filed on Jul. 31, 2017. The entire contents of each application are hereby incorporated herein by reference.

BACKGROUND OF THE INVENTION

1. Field of the Invention

The present invention relates to an electronic component including an element body and an outer electrode, and to a manufacturing method for the electronic component.

2. Description of the Related Art

For example, International Publication No. 2013/136936 discloses an existing electronic component. The electronic component disclosed in International Publication No. 2013/136936 includes an element body that includes a circuit element defined by an electrode pattern therein and an outer electrode that is provided outside the element body.

However, in the electronic component disclosed in International Publication No. 2013/136936, when a ceramic element body including glass made of a BAS material or the like mainly including Ba, Al and Si is used as an element body, further improvement in impact resistance is required.

SUMMARY OF THE INVENTION

Preferred embodiments of the present invention provide electronic components and manufacturing methods for the electronic components, which improve impact resistance.

An electronic component according to a preferred embodiment of the present invention includes a ceramic element body including glass; and a plurality of outer electrodes provided on the ceramic element body, in which each of the plurality of outer electrodes includes a base electrode layer that is provided on the ceramic element body and includes a buffer portion to buffer an impact, and the base electrode layer includes a first region that is disposed on the ceramic element body and includes the buffer portion of equal to or more than about 15 vol % and equal to or less than about 50 vol % in a volume of the first region, and a second region that covers the first region and includes the buffer portion of equal to or more than about 1 vol % and equal to or less than about 10 vol % in a volume of the second region.

In an electronic component according to a preferred embodiment of the present invention, it is preferable that a thickness of the first region is equal to or more than about 5 μm and equal to or less than about 40 μm, and a thickness of the second region is equal to or more than about 1 μm and equal to or less than about 15 μm.

In an electronic component according to a preferred embodiment of the present invention, it is preferable that the ceramic element body includes a first end surface and a second end surface which face each other in a length direction, a first side surface and a second side surface which face each other in a width direction orthogonal or substantially orthogonal to the length direction, and a first main surface and a second main surface which face each other in a height direction orthogonal or substantially orthogonal to the length direction and the width direction. In this case, at least one or more of the outer electrodes may be provided on each of the first side surface, the second side surface, the first end surface, and the second end surface, and two or more of the outer electrodes may be provided on at least one surface of the first side surface, the second side surface, the first end surface, and the second end surface.

In an electronic component according to a preferred embodiment of the present invention, it is preferable that the electronic component further include a hollow cavity portion provided in the ceramic element body, and a pair of discharge electrodes that oppose each other in the hollow cavity portion.

In an electronic component according to a preferred embodiment of the present invention, the buffer portion may be a void.

A manufacturing method for an electronic component according to a preferred embodiment of the present invention includes preparing an element body portion including glass; applying a first conductive paste including a buffer portion forming member for forming a buffer portion to buffer an impact onto the element body portion; applying a second conductive paste including the buffer portion forming member onto the first conductive paste; and firing the element body portion, the first conductive paste, and the second conductive paste, in which in the applying the first conductive paste, in a state after the firing, the first conductive paste is applied such that the buffer portion is included at equal to or more than about 15 vol % and equal to or less than about 50 vol % in a volume of the first conductive paste, and in the applying the second conductive paste, in a state after the firing, the second conductive paste is applied such that the buffer portion is included at equal to or more than about 1 vol % and equal to or less than about 10 vol % in a volume of the second conductive paste.

In a manufacturing method for an electronic component according to a preferred embodiment of the present invention, it is preferable that the element body portion including a first end surface and a second end surface which face each other in a length direction, a first side surface and a second side surface which face each other in a width direction orthogonal or substantially orthogonal to the length direction, and a first main surface and a second main surface which face each other in a height direction orthogonal or substantially orthogonal to the length direction and the width direction is prepared. In this case, in the applying the first conductive paste, the first conductive paste may be applied to each of the first side surface, the second side surface, the first end surface, and the second end surface along the height direction so as to be separated from one another, and on at least one surface of the first side surface, the second side surface, the first end surface, and the second end surface, the first conductive paste may be applied to two or more locations so as to be separated from one another.

In a manufacturing method for an electronic component according to a preferred embodiment of the present invention, as the element body portion, a multilayer chip including a resin paste for forming a hollow cavity portion in an inside and including an electrode paste for forming a pair of discharge electrodes in the hollow cavity portion may be used.

In a manufacturing method for an electronic component according to a preferred embodiment of the present invention, the buffer portion may be a void. In this case, it is preferable that the buffer portion forming member is a void portion forming material.

A manufacturing method for an electronic component according to a preferred embodiment of the present invention includes preparing an element body portion including glass; applying a conductive paste including a buffer portion forming member for forming a buffer portion to buffer an impact onto the element body portion; forming a base electrode layer on a ceramic element body by firing the element body portion and the conductive paste; and surface-treating the base electrode layer, in which in the surface-treating of the base electrode layer, in the base electrode layer, a first region that is disposed on the ceramic element body and includes the buffer portion of equal to or more than about 15 vol % and equal to or less than about 50 vol %, and a second region that covers the first region and includes the buffer portion of equal to or more than about 1 vol % and equal to or less than about 10 vol % are formed.

In a manufacturing method for an electronic component according to a preferred embodiment of the present invention, the surface-treating of the base electrode layer may include feeding a plurality of the ceramic element bodies on each of which the base electrode layer is formed and a plurality of media into a container, and vibrating the container. In this case, it is preferable that the container including a bottom portion and a peripheral wall portion connected to a peripheral edge of the bottom portion is used. Further, in a case in which an imaginary axis with an annular shape surrounding a central axis of the bottom portion in a circumferential direction in a state before the vibrating the container is imagined, in the vibrating, it is preferable that vibration be applied to the ceramic element bodies and the media such that the ceramic element bodies and the media draw a spiral locus spirally surrounding the imaginary axis along an axial direction of the imaginary axis.

In a manufacturing method for an electronic component according to a preferred embodiment of the present invention, it is preferable that the element body portion including a first end surface and a second end surface which face each other in a length direction, a first side surface and a second side surface which face each other in a width direction orthogonal or substantially orthogonal to the length direction, and a first main surface and a second main surface which face each other in a height direction orthogonal or substantially orthogonal to the length direction and the width direction is prepared. In this case, in the applying the conductive paste, the conductive paste may be applied to each of the first side surface, the second side surface, the first end surface, and the second end surface along the height direction so as to be separated from one another, and on at least one surface of the first side surface, the second side surface, the first end surface, and the second end surface, the conductive paste may be applied to two or more locations so as to be separated from one another.

In a manufacturing method for an electronic component according to a preferred embodiment of the present invention, as the element body portion, a multilayer chip including a resin paste for forming a hollow cavity portion in an inside and including an electrode paste for forming a pair of discharge electrodes in the hollow cavity portion may be used.

In a manufacturing method for an electronic component according to a preferred embodiment of the present invention, the buffer portion may be a void. In this case, it is preferable that the buffer portion forming member is a void portion forming material.

According to preferred embodiments of the present invention, electronic components and manufacturing methods for the electronic components are provided, which improve impact resistance.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 17 is a schematic diagram illustrating a configuration of an electronic component according to a second preferred embodiment of the present invention.

FIG. 18 is a circuit diagram illustrating the configuration of the electronic component according to the second preferred embodiment of the present invention.

FIG. 19 is a diagram showing in detail a conductive paste used in a first verification experiment and a second verification experiment performed to verify advantageous effects of the preferred embodiments of the present invention.

FIG. 20 is a diagram showing conditions and results of the first verification experiment performed to verify the advantageous effects of the preferred embodiments of the present invention.

FIG. 21 is a diagram showing conditions and results of the second verification experiment performed to verify the advantageous effects of the preferred embodiments of the present invention.

DETAILED DESCRIPTION OF THE PREFERRED EMBODIMENTS

Figure 1:
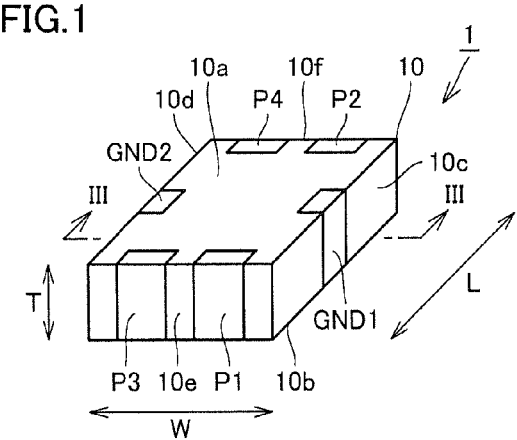
FIG. 1 is a schematic perspective view of an electronic component according to a first preferred embodiment of the present invention.

Hereinafter, preferred embodiments of the present invention will be described in detail with reference to the accompanying drawings. Note that in the following preferred embodiments, identical reference numerals are assigned to identical or common components and elements in the drawings, and descriptions thereof will not be repeated.

First Preferred Embodiment

Figure 2:
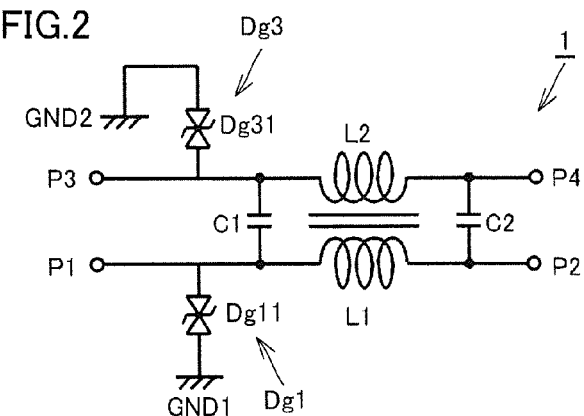
FIG. 2 is a circuit diagram illustrating a configuration of the electronic component according to the first preferred embodiment of the present invention.
Figure 3:
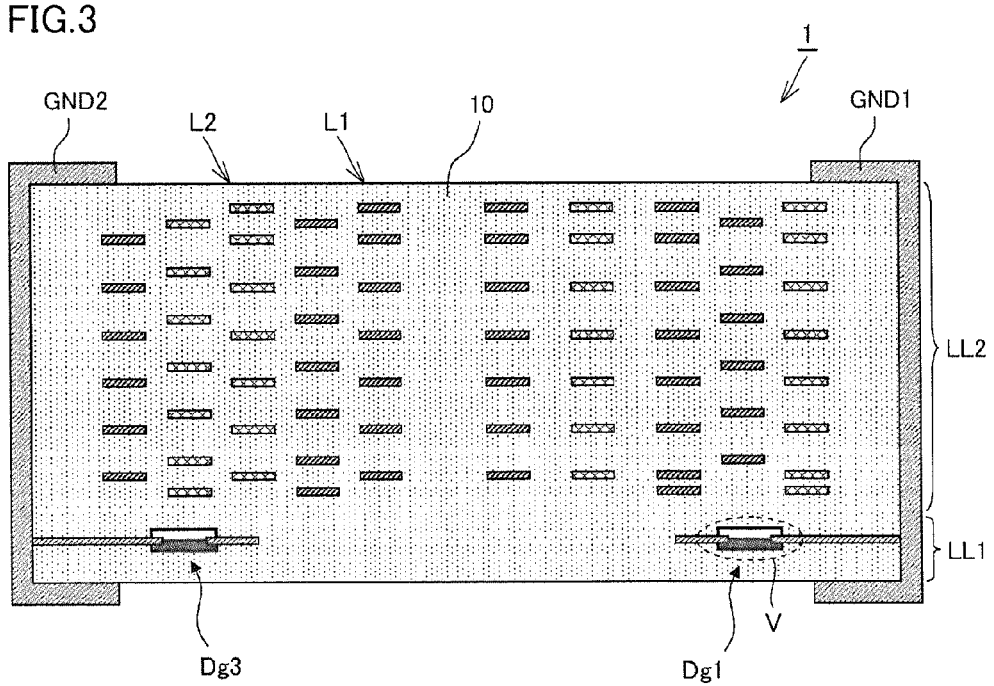
FIG. 3 is a cross-sectional view taken along a line III-III illustrated in FIG. 1.

FIG. 1 is a schematic perspective view of an electronic component according to a first preferred embodiment of the present invention. FIG. 2 is a circuit diagram illustrating a configuration of the electronic component according to the first preferred embodiment. FIG. 3 is a cross-sectional view taken along a line III-III illustrated in FIG. 1. Referring to FIG. 1 to FIG. 3, an electronic component 1 according to the first preferred embodiment will be described.

As illustrated in FIG. 1, the electronic component 1 has a rectangular or substantially rectangular parallelepiped outer shape. The electronic component 1 includes a ceramic element body 10, and a plurality of outer electrodes P1, P2, P3, P4, GND1, and GND2.

The ceramic element body 10 has a rectangular or substantially rectangular parallelepiped outer shape. The ceramic element body 10 includes a first main surface 10a and a second main surface 10b which face each other in a height direction T, a first side surface 10c and a second side surface 10d which face each other in a width direction W orthogonal or substantially orthogonal to the height direction T, and a pair of first end surface 10e and second end surface 10f which face each other in a length direction L orthogonal or substantially orthogonal to both the height direction T and the width direction W.

Although the outer shape of the ceramic element body 10 is a rectangular or substantially rectangular parallelepiped shape, it is preferable that a corner portion and a ridge line portion of the ceramic element body 10 are rounded. The corner portion is a portion at which three surfaces of the ceramic element body 10 intersect with one another, and the ridge line portion is a portion at which two surfaces of the ceramic element body 10 intersect each other. In addition, irregularities may exist on at least one of the first main surface 10a, the second main surface 10b, the first side surface 10c, the second side surface 10d, the first end surface 10e, and the second end surface 10f.

The ceramic element body 10 includes glass. The ceramic element body 10 includes a plurality of dielectric layers and a plurality of conductor patterns which are alternately laminated along a lamination direction that is the height direction T. The plurality of dielectric layers are preferably made of, for example, a low-temperature sintered ceramic material including $Ba-Al_2O_3-SiO_2$ as a main component. The conductor patterns are preferably, for example, made of a metal material represented by Ni, Cu, Ag, Pd, an Ag—Pd alloy, Au, or other suitable material.

A representative value of a length dimension L0, a width dimension W0, and a height dimension T0 of the ceramic element body 10 is preferably, for example, about 1.25 [mm]×about 1.0 [mm]×about 0.75 [mm].

The plurality of outer electrodes P1, P2, P3, P4, GND1, and GND2 are provided on the ceramic element body 10. The outer electrodes P1, P2, P3, and P4 define and function as input and output terminals. The outer electrodes GND1 and GND2 define and function as ground electrodes.

At least one or more outer electrodes are provided on each of the first side surface 10c, the second side surface 10d, the first end surface 10e, and the second end surface 10f described above. Two or more outer electrodes are provided on at least one of the first side surface 10c, the second side surface 10d, the first end surface 10e, and the second end surface 10f.

The outer electrodes P1 and P3 are provided on the first end surface 10e and spaced apart from each other in the width direction W. The outer electrodes P1 and P3 extend from the first end surface 10e to the first main surface 10a and the second main surface 10b.

The outer electrodes P2 and P4 are provided on the second end surface 10f and spaced apart from each other in the width direction W. The outer electrodes P2 and P4 extend from the second end surface 10f to the first main surface 10a and the second main surface 10b.

The outer electrode P2 faces the outer electrode P1 in the length direction L. The outer electrode P4 faces the outer electrode P3 in the length direction L.

The outer electrode GND1 is provided on the first side surface 10c. The outer electrode GND1 extends from the first side surface 10c to the first main surface 10a and the second main surface 10b. The outer electrode GND1 is provided at an approximate center portion of the first side surface 10c in the length direction L.

The outer electrode GND2 is provided on the second side surface 10d. The outer electrode GND2 extends from the second side surface 10d to the first main surface 10a and the second main surface 10b. The outer electrode GND2 is provided at an approximate center portion of the second side surface 10d in the length direction L. The outer electrode GND2 faces the outer electrode GND1 in the width direction W.

Detailed configurations of the outer electrodes P1, P2, P3, P4, GND1, and GND2 will be described below with reference to FIG. 8.

As illustrated in FIG. 2 and FIG. 3, a primary coil L1, a secondary coil L2, and ESD protection elements Dg1 and Dg3 are provided inside the ceramic element body 10. The primary coil L1 and the secondary coil L2 make a strong magnetic field coupling by a common mode current flowing therethrough. Stray capacitance is generated between the primary coil L1 and the secondary coil L2. In FIG. 2, the stray capacitance is represented by the capacitors C1 and C2 as a lumped constant circuit.

Figure 4:
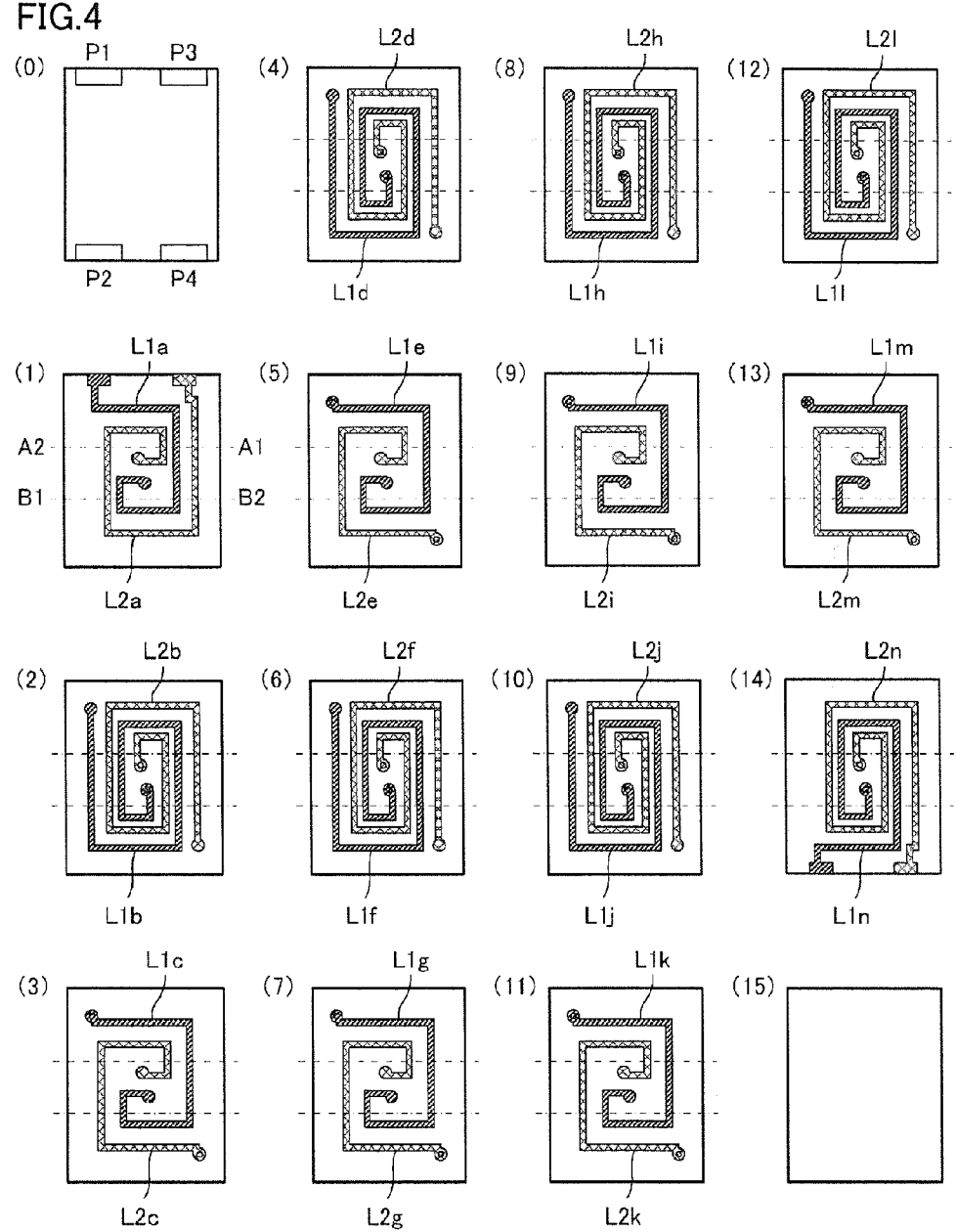
FIG. 4 is an exploded plan view illustrating conductor patterns of the electronic component according to the first preferred embodiment of the present invention.

As illustrated in FIG. 4, electrodes defining the outer electrodes P1 to P4 are provided on a bottom surface of a lowermost layer (0). On layers (1) to (14) of the ceramic element body 10, first linear conductors (conductor patterns) L1a to L1n and second linear conductors (conductor patterns) L2a to L2n are provided, respectively.

A circular pattern illustrated in FIG. 4 indicates a connection portion (pad portion) of a via hole conductor. The double circular pattern indicates the via hole conductor (interlayer conductor). With this structure, the linear conductors adjacent to each other in the lamination direction of the respective layers are connected between the layers.

The primary coil L1 includes the first linear conductors Lia to Lin and via hole conductors connecting the linear conductors. Additionally, the secondary coil L2 includes the second linear conductors L2a to L2n and via hole conductors connecting the linear conductors.

An end portion of the first linear conductor Lia is connected to the outer electrode P1, and an end portion of the first linear conductor Lin is connected to the outer electrode P2, respectively. Additionally, an end portion of the second linear conductor L2a is connected to the outer electrode P3, and an end portion of the second linear conductor L2n is connected to the outer electrode P4, respectively.

In general, when inter-line capacitance (C3 and C4) is generated in the primary coil (L1) and the secondary coil (L2), a self-resonance may occur within a pass band. Therefore, it is preferable that the inter-line capacitance of each coil is as small as possible. In addition, in order to adjust a differential impedance, the capacitance (C1 and C2) between the primary coil (L1) and the secondary coil (L2) is necessary, but if this capacitance excessively increases, the differential impedance decreases.

Figure 5:
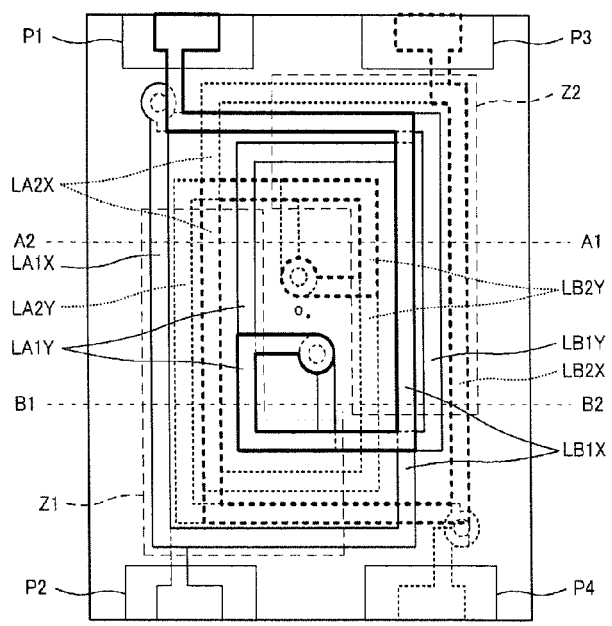
FIG. 5 is a see-through plan view of the conductor pattern of the electronic component according to the first preferred embodiment of the present invention.

FIG. 5 is a see-through plan view of the conductor pattern of the electronic component according to the first preferred embodiment. In FIG. 5, in a first portion Z1, the conductor patterns are disposed such that second linear conductors LA2X and LA2Y are sandwiched between a first linear conductor LA1X and a first linear conductor LA1Y. In a second portion Z2, the conductor patterns are disposed such that first linear conductors LB1X and LB1Y are sandwiched between a second linear conductor LB2X and a second linear conductor LB2Y.

Relationships between the respective linear conductors LA1X, LA1Y, LB1X, LB1Y, LA2X, LA2Y, LB2X, and LB2Y illustrated in FIG. 5 and the respective linear conductors illustrated in FIG. 4 are as follows:

LA1X: L1$b$, L1$d$, L1$f$, L1$h$, L1$j$, L1$l$;
LA1Y: L1$a$ to L1$n$;
LB1X: L1$a$, L1$b$, L1$d$, L1$f$, L1$h$, L1$j$, L1$l$, L1$n$;
LB1Y: L1$c$, L1$e$, L1$g$, L1$i$, L1$k$, L1$m$;
LA2X (LB2X): L2$a$, L2$b$, L2$d$, L2$f$, L2$h$, L2$j$, L2$l$, L2$n$;
LA2Y: L2$c$, L2$e$, L2$g$, L2$i$, L2$k$, L2$m$; and
LB2Y: L2$a$ to L2$n$.

As described above, since the respective conductor patterns are disposed such that the second linear conductors LA2X and LA2Y are sandwiched between the first linear conductor LA1X and the first linear conductor LA1Y in the first portion Z1 and the first linear conductors LB1X and LB1Y are sandwiched between the second linear conductor LB2X and the second linear conductor LB2Y in the second portion Z2, that is, the first linear conductor and the second linear conductor do not overlap with each other in a layering direction, the inter-line capacitance between the first linear conductor and the second linear conductor is small. Therefore, while maximizing an outer diameter (outer shape) of the spiral pattern, the primary coil and the secondary coil are able to provide the magnetic field coupling with a high degree of coupling, without increasing the capacitive coupling between the primary coil and the secondary coil. Accordingly, for a normal mode signal, since the magnetic fields of the primary coil and the secondary coil cancel each other, an inductance component of a common mode coil decreases, and thus the impedance decreases. As a result, since the inductance and the capacitance both decrease, an insertion loss of the normal mode signal is small.

When the common mode current flows in the electronic component 1, a magnetic flux of the primary coil and a magnetic flux of the secondary coil strengthen each other, and thus, the coils act as a large inductor. Therefore, the impedance when the electronic component 1 is viewed from the outer electrodes P1 and P3 is high, and the common mode current (common mode noise) is reduced or prevented.

Further, in the electronic component 1, when a normal mode current flows, the magnetic flux of the primary coil and the magnetic flux of the secondary coil cancel each other, and thus, the coils do not substantially act as an inductor. Accordingly, the normal mode signal is transmitted with a low loss.

As described above, since the primary coil L1 and the secondary coil L2 are able to be strongly coupled even without using a magnetic body, such as ferrite, for the ceramic element body 10, even in a case in which the dielectric is used for the ceramic element body 10, the loss of the normal mode signal particularly in a high frequency band is not increased.

Further, since the first linear conductors Lia to Lin and the second linear conductors L2a to L2n are in or substantially in point symmetry with respect to the central axes of the primary coil and the secondary coil when viewed in a plan view from the lamination direction of a plurality of base material layers, the symmetry of the circuit including the stray components between the outer electrodes P1-P3 and the outer electrodes P2-P4 is high. Therefore, conversion from the common mode noise to the normal mode signal (noise) is reduced or prevented.

The ESD protection element Dg1 is provided on a previous stage side of the primary coil L1. The ESD protection element Dg1 connects the outer electrode GND1 and the outer electrode P1. The ESD protection element Dg3 is provided on a previous stage side of the secondary coil L2. The ESD protection element Dg3 connects the outer electrode GND2 and the outer electrode P3.

Although, in the above description, a case in which the two ground terminals, that is, the outer electrodes GND1 and GND2 are provided has been described as an example, the configuration is not limited thereto, and one common ground terminal may be provided. Further, depending on the purpose, the ESD protection element may be provided only between the outer electrode P1 and the outer electrode GND1, or the ESD protection element may be provided only between the outer electrode P3 and the outer electrode GND2.

FIG. 4 is an exploded plan view illustrating the conductor pattern of the electronic component according to the first preferred embodiment. Referring to FIG. 4, the conductor pattern of the electronic component 1 will be described. In FIG. 4, (0) is a bottom view of the lowermost layer of the ceramic element body 10, (1) is a top view of the lowermost layer of the ceramic element body 10, and (15) is a top view of an uppermost layer of the ceramic element body 10. Note that, in FIG. 4, for the sake of convenience, the ESD protection elements Dg1 and Dg3 are omitted.

Figure 6:
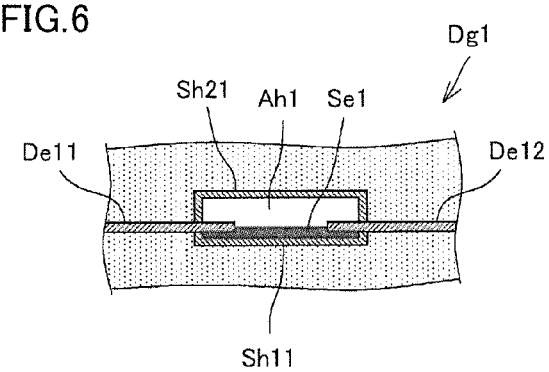
FIG. 6 is a cross-sectional view of an ESD protection element included in the electronic component according to the first preferred embodiment of the present invention.
Figure 7:
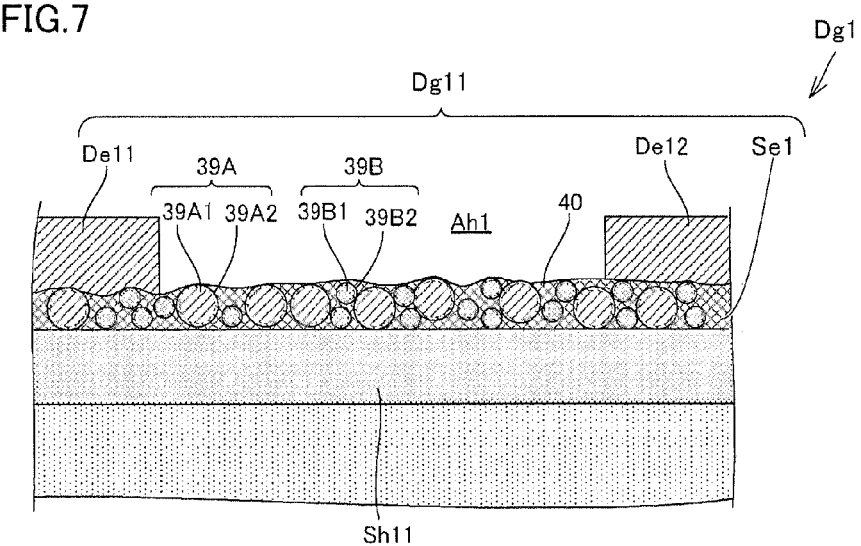
FIG. 7 is a cross-sectional view illustrating the ESD protection element illustrated in FIG. 6 in detail.

FIG. 6 is a cross-sectional view of the ESD protection element included in the electronic component according to the first preferred embodiment. FIG. 7 is a cross-sectional view illustrating the ESD protection element illustrated in FIG. 6 in detail. Referring to FIG. 6 and FIG. 7, a configuration of the ESD protection element will be described. Note that since the ESD protection elements Dg1 and Dg3 have the same or substantially the same configuration, the configuration of the ESD protection element will be described here while focusing on the ESD protection element Dg1.

As illustrated in FIG. 6 and FIG. 7, the ESD protection element Dg1 includes a shield layer Sh11, a discharge auxiliary electrode Se1, discharge electrodes De11 and De12, a hollow cavity portion Ah1, and a shield layer Sh21.

The shield layer Sh11 is preferably an insulating ceramic layer, for example, and prevents the glass component from exuding to the discharge auxiliary electrode Se1 portion when a green sheet defining the ceramic element body 10 is integrally fired.

The discharge auxiliary electrode Se1 includes discharge auxiliary materials 39A and 39B. The discharge auxiliary material 39A includes a metal material 39A1 having a particle shape and an insulating coating film 39A2 provided on a surface of the metal material 39A1. Further, the discharge auxiliary electrode Se1 includes a semiconductor material 39B1 having a particle shape and an insulating coating film 39B2 provided on a surface of the semiconductor material 39B1. Here, the metal material 39A1 is preferably a Cu particle, and the semiconductor material 39B1 is preferably an SiC particle, for example. Further, for example, the insulating coating film 39A2 is preferably an alumina coating film, and the insulating coating film 39B2 is preferably an SiO$_2$ coating film obtained by oxidizing the semiconductor material 39B1.

A glass substance 40 is included in the discharge auxiliary electrode Se1 so as to surround the discharge auxiliary materials 39A and 39B. The glass substance 40 is not intentionally provided, but is provided by a reaction, such as oxidation or other reaction, of a material derived from a peripheral member of a sacrificial layer used to form the hollow cavity portion Ah1.

When a high voltage is applied between the discharge electrodes De11 and De12, a creeping discharge of the discharge auxiliary electrode Se1, an aerial discharge between the discharge electrodes De11 and De12, and a discharge which propagates the discharge auxiliary materials 39A and 39B like stepping-stones occur. Due to these discharges, static electricity is discharged.

When static electricity exceeding a voltage to be protected is applied to the outer electrode P1, a discharge element Dg11, which will be described later, included in the ESD protection element Dg1 discharges (conducts) to be a low impedance. With this, the static electricity applied to the outer electrode P1 is shunted to the outer ground electrode GND1 through the discharge element Dg11.

In the same or similar manner, when static electricity exceeding a voltage to be protected is applied to the outer electrode P3, a discharge element Dg31 conducts to be a low impedance. With this, the static electricity applied to the outer electrode P3 is shunted to the ground through the discharge element Dg31.

It is preferable that the ESD protection elements Dg1 and Dg3 are provided on the side at which the static electricity enters. In particular, even in a case in which an input impedance of a circuit connected to the outer electrodes P2 and P4 as input and output terminals is low, a common mode choke coil including the primary coil L1 and the secondary coil L2 has a high impedance against a surge of a high frequency component, such as ESD. Therefore, the surge is reflected by the common mode choke coil, a high voltage is applied to the discharge elements Dg11 and Dg31, and the discharge elements Dg11 and Dg31 quickly reach a discharge voltage and start discharging. With this, the surge is more reliably prevented from flowing into the circuit connected to the outer electrodes P2 and P4.

Note that, as the ESD protection element, for example, an element using a voltage-dependent variable resistance method, such as a nonlinear resistance element, such as a varistor or other suitable element, may preferably be used. As described above, when using the ESD protection element of an inter-electrode discharge method (spark gap method) respectively including the hollow cavity portion provided in the ceramic element body 10 and a pair of discharge electrodes provided in the hollow cavity portion, a good response is able to be ensured and the element is able to be reduced or prevented from being broken due to an inrush current.

Figure 8:
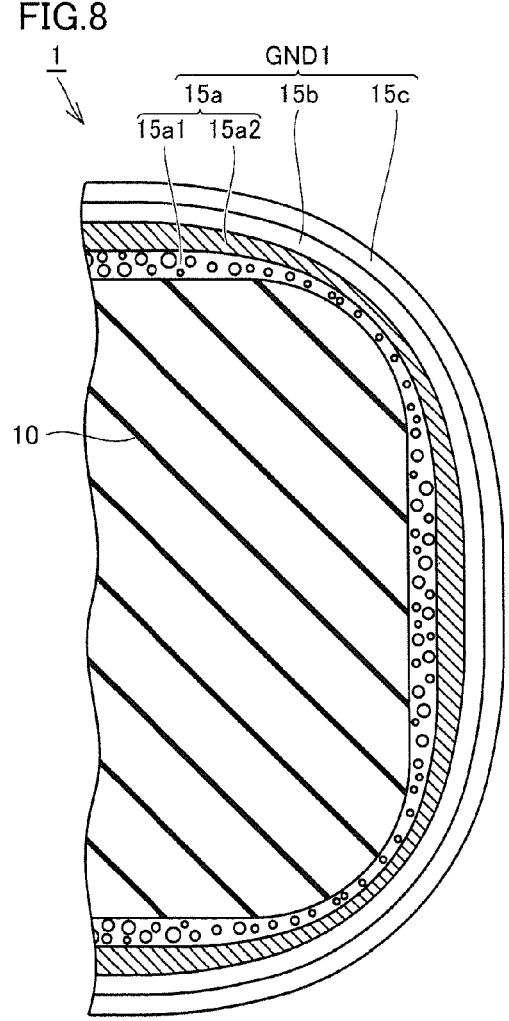
FIG. 8 is a cross-sectional view illustrating a configuration of an outer electrode of the electronic component according to the first preferred embodiment of the present invention.

FIG. 8 is a cross-sectional view illustrating a configuration of the outer electrode of the electronic component according to the first preferred embodiment. Referring to FIG. 8, the configuration of the outer electrode will be described. Note that since the plurality of outer electrodes have the same or substantially the same configuration, the configuration of the outer electrode GND1 will be described here, and descriptions of the configurations of the other outer electrodes will be omitted.

The outer electrode GND1 includes a base electrode layer 15a, and a plating layer provided on the base electrode layer 15a. The plating layer includes a first plating layer 15b and a second plating layer 15c laminated on the first plating layer 15b.

The base electrode layer 15a includes a void, glass, and a metal. Preferred examples of the metal included in the base electrode layer 15a include an appropriate metal such as Ni, Cu, Ag, Pd, Au, an Ag—Pd alloy, or other suitable metal. As the metal, for example, Cu or Ag having high malleability is preferably used. Note that the metal included in the base electrode layer 15a may be confirmed by using a wavelength dispersive X-ray analyzer (WDX) after polishing the electronic component 1. Note that when polishing, for example, the electronic component 1 is polished to a central position in the width direction W, and a cross section orthogonal or substantially orthogonal to the width direction W is exposed.

The base electrode layer 15a includes a first region 15a1 and a second region 15a2 from the ceramic element body 10 side toward a surface layer side of the base electrode layer 15a.

The first region 15a1 includes a substantial amount of voids and glass. The voids and glass correspond to a buffer portion to buffer an external impact. The first region 15a1 preferably includes, for example, the glass and voids so as to be equal to or more than about 15 vol % and equal to or less than about 50 vol %. With the first region 15a1 including the voids and glass at such a ratio, the base electrode layer 15a has a cushioning property. Thus, it is possible to absorb the external impact imparted on the electronic component 1.

A thickness of the first region 15a1 is preferably, for example, equal to or more than about 3 μm and equal to or less than about 40 μm, and more preferably equal to or more than about 5 μm and equal to or less than about 40 μm. By setting the thickness of the first region 15a1 to be equal to or more than about 3 μm and equal to or less than about 40 μm, a good cushioning property is obtained. By setting the thickness of the first region 15a1 to be equal to or more than about 5 μm and equal to or less than about 40 μm, a further improved cushioning property is obtained.

The second region 15a2 includes a smaller amount of glass and voids than that of the first region 15a1. The glass and voids correspond to the buffer portion to buffer the external impact. The second region 15a2 preferably includes, for example, the glass and voids so as to be equal to or more than about 1 vol % and equal to or less than about 10 vol %. With the second region 15a2 including the glass and voids at such a ratio, the surface of the second region 15a2 is smooth and the denseness of the metal is increased from the surface layer of the base electrode layer 15a in the thickness direction. As a result, it is possible to improve the plating property and to reduce or prevent the plating from entering, and thus, it is possible to improve the reliability of the electronic component 1.

A thickness of the second region 15a2 is preferably, for example, equal to or more than about 0.5 μm and equal to or less than about 15 μm, and more preferably equal to or more than about 1 μm and equal to or less than about 15 μm. By setting the thickness of the second region 15a2 to be equal to or more than about 0.5 μm and equal to or less than about 15 μm, it is possible to reduce or prevent the plating from entering. By setting the thickness of the second region 15a2 to be equal to or more than about 1 μm and equal to or less than about 15 μm, it is possible to more effectively reduce or prevent the plating from entering.

Note that when the second region 15a2 is formed by rubbing the surface layer of the base electrode layer with a medium 20 (see FIG. 16) using a surface treatment apparatus 100 (see FIG. 11), as will be described below, by setting the thickness of the second region 15a2 to be equal to or less than about 10 μm, damage to the ceramic element body 10 is able to be suppressed, and chipping and breaking of the ceramic element body 10 is able to be reduced or prevented.

The thicknesses of the first region 15a1 and the second region 15a2 may be confirmed under SEM observation after polishing the electronic component 1. In a case of the outer electrode GND1, for example, by polishing the electronic component 1 to a position of approximately ½ of the dimension in the length direction L, a cross section along the width direction W and the height direction T is exposed. At a position of approximately ½ of the dimension in the height direction T, a thickness from the first side surface 10c to a surface of the first region 15a1 along the width direction W is measured, and a thickness from the surface of the first region 15a1 to a surface of the second region 15a2 along the width direction W is measured.

A material used for the first plating layer 15b and the second plating layer 15c is preferably, for example, one metal selected from a group consisting of Ni, Cu, Ag, Pd, Au and Sn, or an alloy including these metals.

For example, the first plating layer 15b is preferably an Ni plating layer, and the second plating layer 15c is preferably, for example, an Sn plating layer. The Ni plating layer prevents the base electrode layer from being corroded by solder when a multilayer ceramic capacitor is mounted. The Sn plating layer improves the wettability with the solder when the multilayer ceramic capacitor is mounted and facilitating mounting of the multilayer ceramic capacitor. A thickness per one layer of the plating layer is preferably, for example, equal to or more than about 1.5 μm and equal to or less than about 15.0 μm. Note that the plating layer may be a single layer, and may be a Cu plating layer or an Au plating layer, for example.

As described above, the electronic component 1 according to the first preferred embodiment includes the ceramic element body 10 including glass; and the plurality of outer electrodes provided on the ceramic element body 10, in which each of the plurality of outer electrodes includes the base electrode layer 15a that is provided on the ceramic element body 10 and includes the buffer portion to buffer the external impact, and the base electrode layer 15a includes the first region 15a1 that is provided on the ceramic element body 10 and includes the buffer portion of equal to or more than about 15 vol % and equal to or less than about 50 vol %, and the second region 15a2 that covers the first region 15a1 and includes the buffer portion of equal to or more than about 1 vol % and equal to or less than about 10 vol %.

With the first region 15a1 including the buffer portion at the above ratio, good cushioning properties are able to be obtained and the external impact is able to be absorbed. As a result, it is possible to improve the impact resistance of the electronic component. Further, with the second region 15a2 including a buffer portion at the above ratio, the surface layer side of the base electrode layer 15a is densely structured, the plating property is improved, and thus the, penetration of the plating into the base electrode layer 15a is able to be reduced or prevented.

Further, by setting the thickness of the first region 15a1 to be equal to or more than about 5 μm and equal to or less than about 40 μm and the thickness of the second region 15a2 to be equal to or more than about 1 μm and equal to or less than about 15 μm, in addition to the improvement of the impact resistance, the reduction or prevention of the penetration of the plating into the base electrode layer 15a is able to be more reliably achieved.

In addition, the ceramic element body 10 has the above-described rectangular or substantially rectangular parallelepiped shape including the first end surface 10e and the second end surface 10f, the first side surface 10c and the second side surface 10d, and the first main surface 10a and the second main surface 10b, and at least one or more outer electrodes are provided on each of the first side surface 10c, the second side surface 10d, the first end surface 10e, and the second end surface 10f, and two or more of the outer electrodes are provided on at least one of the first side surface 10c, the second side surface 10d, the first end surface 10e, and the second end surface 10f. Thus, in the electronic component 1, the outer electrodes having the cushioning property are provided in the circumferential direction, and the impact resistance is able to be improved even with respect to various falling directions.

Further, with the electronic component 1 further including the hollow cavity portion Ah1 provided in the ceramic element body 10 and the pair of discharge electrodes opposing each other in the hollow cavity portion Ah1, it is possible to prevent the surge from flowing into the circuit provided in the ceramic element body 10.

Figure 9:
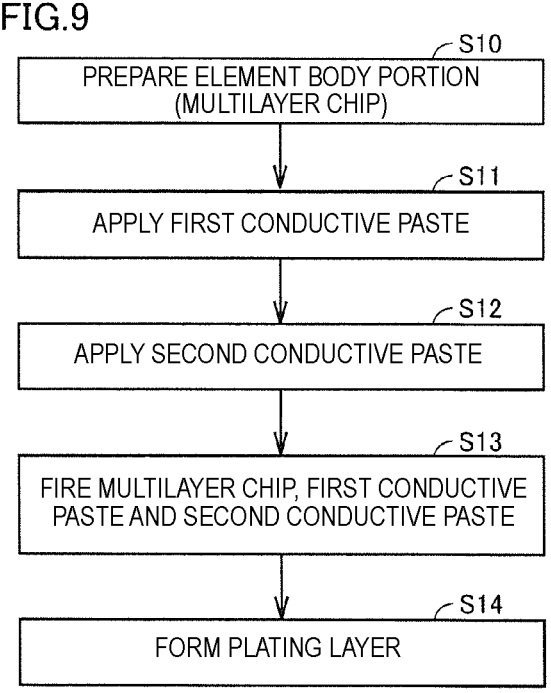
FIG. 9 is a flowchart illustrating a first manufacturing method of the electronic component according to the first preferred embodiment of the present invention.

FIG. 9 is a flowchart illustrating a first manufacturing method of the electronic component according to the first preferred embodiment. Referring to FIG. 9, a first manufacturing method for the electronic component 1 will be described.

As illustrated in FIG. 9, when the electronic component is manufactured using the first manufacturing method for the electronic component 1, first, in step S10, for the element body portion, a multilayer chip is prepared as the element body portion including glass.

Specifically, when preparing the multilayer chip including the glass, a green sheet is first prepared. When preparing the green sheet, a ceramic material is prepared. A material preferably including, for example, a composition mainly including Ba, Al, and Si is used for the ceramic material. The materials are blended and mixed so as to be a predetermined composition to obtain the green sheet having a predetermined thickness.

Next, paste for forming the shield layers Sh11 and Sh21 is prepared. As this paste, an alumina paste including alumina powder as a main component is preferably used, for example. Further, an electrode paste for forming the discharge electrodes De11 and De12 is prepared. The electrode paste is preferably obtained by adding a solvent to a binder resin including Cu powder, ethyl cellulose, and other suitable material, for example, and stirring and mixing them.

Further, a resin paste for forming the hollow cavity portion Ah1 is also prepared. The resin paste is also prepared through the same method. This resin paste includes a resin and a solvent. For the resin material, a resin which decomposes and disappears at the time of firing is used. For example, polyethylene terephthalate, polypropylene, an acrylic resin, or other suitable material is preferably used.

Further, a mixed paste for forming the discharge auxiliary electrode Se1 is preferably obtained, for example, by blending Cu powder as a conductive material and BAS powder as a ceramic material at a predetermined ratio, adding a binder resin and a solvent thereto, and stirring and mixing them.

The paste for the shield layers Sh11 and Sh21 is applied to the green sheet, then the electrode paste for the discharge electrode is applied, the resin paste for forming the hollow cavity portion Ah1 is applied, and furthermore, the paste for the shield layer Sh21 is applied.

A portion other than a portion including a portion that defines and functions as each of the ESD protection elements Dg1 and Dg3, that is, a portion including a portion that defines and functions as each of the primary coil L1 and the secondary coil L2 is formed in the same or similar manner as a normal ceramic multilayer substrate. For example, the portion is formed by forming a through-hole in the green sheet by machining or laser processing and filling the through-hole with an electrode paste which defines and functions as the conductor pattern, or applying the electrode paste onto the green sheet through screen printing or other suitable method.

The green sheet to which the paste for the shield layers Sh11 and Sh21, the electrode paste for the discharge electrode, the resin paste, and the paste for the shield layer Sh21 are applied, and the green sheet which is filled with the electrode paste or on which printing of the electrode paste is performed as described above are stacked and subjected to pressure bonding. With this, a multilayer block in which the plurality of green sheets is stacked and subjected to pressure bonding is formed.

Next, the multilayer block is divided to form the multilayer chips. Specifically, the multilayer block is divided in a matrix shape by press cutting, cutting with a dicing machine, or laser cutting, for example, and is divided into a plurality of individual multilayer chips. Each of the multilayer chips in the form of individual pieces has a rectangular of substantially rectangular parallelepiped shape and includes the first end surface and the second end surface which face each other in the length direction, the first side surface and the second side surface which face each other in the width direction orthogonal or substantially orthogonal to the length direction, and the first main surface and the second main surface which face each other in the height direction orthogonal or substantially orthogonal to the length direction and the width direction. Each of the multilayer chips in the form of individual pieces includes the resin paste for forming the hollow cavity portion in the inside, and the electrode paste for forming the pair of discharge electrodes in the hollow cavity portion.

Next, barrel polishing of the multilayer chip is performed. Specifically, the multilayer chip is sealed in a small box called a barrel with media balls having a higher hardness than the dielectric material, and the barrel is rotated, such that the multilayer chip is polished. With this, the corner portion and the ridge line portion of the multilayer chip are rounded.

Next, the outer electrode is formed. Specifically, in step S11, a first conductive paste including a buffer portion forming member for forming the buffer portion to buffer the external impact is applied onto the multilayer chip. At this time, the first conductive paste is applied such that the above-described buffer portion is preferably included at, for example, equal to or more than about 15 vol % and equal to or less than about 50 vol % in a state after sintering.

In addition to conductive fine particles such as Cu powder, for example, the first conductive paste includes glass and a burn-off material, such as resin beads, for example. The glass and the burn-off material such as resin beads correspond to the buffer portion forming member for forming the buffer portion to buffer the external impact.

Note that when applying the first conductive paste, it is preferable that the first conductive paste is applied to each of the first side surface 10c, the second side surface 10d, the first end surface 10e, and the second end surface 10f along the height direction T so as to be spaced apart from one another, and on at least one surface of the first side surface 10c, the second side surface 10d, the first end surface 10e, and the second end surface 10f, the first conductive paste is applied to two or more positions so as to be spaced apart from one another.

Next, in step S12, a second conductive paste including the buffer portion forming member is applied onto the first conductive paste. At this time, the second conductive paste is applied such that the buffer portion is preferably included at, for example, equal to or more than about 1 vol % and equal to or less than 10 vol % in a state after sintering.

It is preferable that an amount of the buffer portion forming member included in the second conductive paste is less than an amount of the buffer portion forming member included in the first conductive paste. Note that the amount of the second conductive paste to be applied may be more than, may be equal to, or may be less than the amount of the first conductive paste to be applied.

Next, in step S13, the multilayer chip onto which the first conductive paste and the second conductive paste are applied is fired. Specifically, the multilayer chip is heated, such that the dielectric material and the conductive material included in the multilayer chip are fired to form the ceramic element body 10. Note that the firing is preferably performed in an N2 atmosphere, for example. When a noble gas, such as Ar, Ne, or other noble gas is introduced into the hollow cavity portion in order to reduce a response voltage to the ESD, the firing may be performed in the noble gas atmosphere in a temperature region in which shrinkage and sintering of the ceramic material are performed. When the discharge electrodes De11 and De12 and the outer electrode are made of a material which is not oxidized, firing in an air atmosphere may be performed. The firing temperature is preferably, for example, equal to or higher than about 700° C. and equal to or lower than about 1000° C. In this firing step, a plurality of voids are formed in the base electrode layer 15a due to disappearance of the burn-off material.

In a state after firing, the first conductive paste becomes the first region 15a1 including the buffer portion of equal to or more than about 15 vol % and equal to or less than about 50 vol %, and the second conductive paste becomes the second region 15a2 including the buffer portion of equal to or more than about 1 vol % and equal to or less than about 10 vol %.

Further, by firing the multilayer chip, the shield layers Sh11 and Sh21 are formed by the paste for the shield layers Sh11 and Sh21, and the discharge electrodes De11 and De12 are formed by the electrode paste for the discharge electrode. Further, the hollow cavity portion Ah1 is formed by the resin paste, and the shield layer Sh21 is formed by the paste for the shield layer Sh21. Further, the primary coil L1 and the secondary coil L2 are formed by the electrode paste. As described above, the ceramic element body 10 is formed by firing the multilayer chip. The ceramic element body 10 has the rectangular or substantially rectangular parallelepiped shape.

Next, in step S14, plating layers are formed on the base electrode layer 15a including the first region 15a1 and the second region 15a2. Ni plating and Sn plating, for example, are preferably applied in this order on the second region 15a2, thus forming the first plating layer 15b and the second plating layer 15c. As a result, a plurality of outer electrodes are formed on the outer surface of the ceramic element body 10.

Through the above-described series of steps, the electronic component 1 is manufactured.

As described above, the first manufacturing method for the electronic component includes preparing the multilayer chip as the element body portion including glass; applying the first conductive paste including the buffer portion forming member for forming the buffer portion to buffer the external impact onto the multilayer chip; applying the second conductive paste including the buffer portion forming member onto the first conductive paste; and firing the multilayer chip, the first conductive paste, and the second conductive paste, in which in the applying the first conductive paste, in the state after the firing, the first conductive paste is applied such that the buffer portion is included at equal to or more than about 15 vol % and equal to or less than about 50 vol %, and in the applying the second conductive paste, in the state after the firing, the second conductive paste is applied such that the buffer portion is included at equal to or more than about 1 vol % and equal to or less than about 10 vol %.

As a result, it is possible to form a dense metal film layer on the surface layer side of the base electrode layer 15a while forming the first region 15a1 having an appropriate cushioning property inside the base electrode layer 15a in the manufactured electronic component. As a result, by using the first manufacturing method for the electronic component, it is possible to manufacture the electronic component which has excellent impact resistance. In addition, it is possible to manufacture the electronic component capable of reducing or preventing penetration of the plating.

Figure 10:
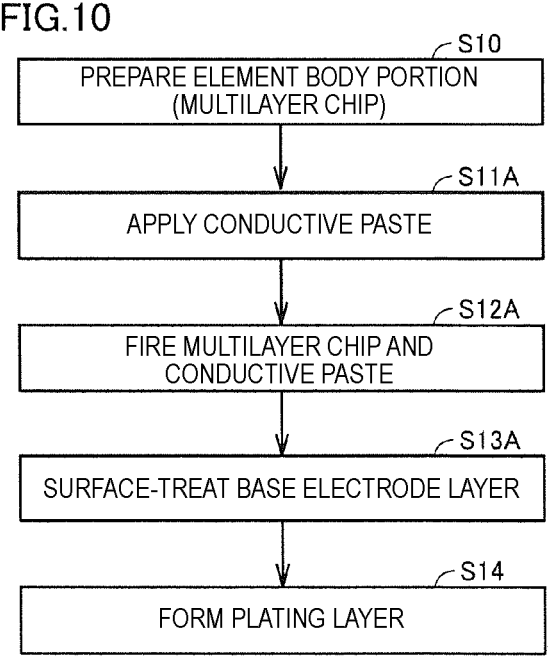
FIG. 10 is a flowchart illustrating a second manufacturing method of the electronic component according to the first preferred embodiment of the present invention.

FIG. 10 is a flowchart illustrating a second manufacturing method of the electronic component according to the first preferred embodiment. Referring to FIG. 10, a second manufacturing method for the electronic component 1 will be described.

As illustrated in FIG. 10, when the electronic component is manufactured using the second manufacturing method for the electronic component 1, in step S10, in the same or similar manner as the first manufacturing method for the electronic component 1, the multilayer chip is prepared as the element body portion.

Next, the outer electrode is formed. Specifically, in step S11A, a conductive paste including the buffer portion forming member for forming the buffer portion to buffer the external impact is applied onto the multilayer chip. At this time, the conductive paste is applied such that the above-described buffer portion is preferably included at, for example, equal to or more than about 15 vol % and equal to or less than about 50 vol % in a state after firing.

In addition to the conductive fine particles such as Cu powder, for example, the conductive paste includes the glass and the burn-off material such as resin beads. The glass and the burn-off material such as resin beads correspond to the buffer portion forming member for forming the buffer portion to buffer the external impact.

Note that when applying the conductive paste, it is preferable that the conductive paste is applied to each of the first side surface 10c, the second side surface 10d, the first end surface 10e, and the second end surface 10f along the height direction T so as to be spaced apart from one another, and on at least one surface of the first side surface 10c, the second side surface 10d, the first end surface 10e, and the second end surface 10f, the conductive paste is applied to two or more positions so as to be spaced apart from one another.

Next, in step S12A, in the same or similar manner as the first manufacturing method, the multilayer chip onto which the conductive paste is applied is fired. With this, the dielectric material and the conductive material included in the multilayer chip are fired, the ceramic element body 10 is formed, and the base electrode layer is formed on the ceramic element body 10. In this firing step, a plurality of voids are formed in the base electrode layer 15a due to disappearance of the burn-off material.

After the firing, the conductive paste becomes the base electrode layer including the buffer portion of equal to or more than about 15 vol % and equal to or less than about 50 vol %.

Next, in step S13A, surface treatment of the base electrode layer is performed. Specifically, in a stirring tank 150 which will be described later, the ceramic element bodies each provided with the base electrode layer and media which will be described later are stirred, such that a surface layer of the base electrode layer is polished while rubbing the surface layer of the base electrode layer with the media. Through this, the glass included in the surface layer of the base electrode layer is reduced, and the surface layer of the base electrode layer is flattened. As a result, a state of the surface layer of the base electrode layer is reformed to form the second region 15a2 having a smooth surface with high metal denseness. Details of the surface treatment will be described with reference to FIGS. 11 to 16.

Figure 11:
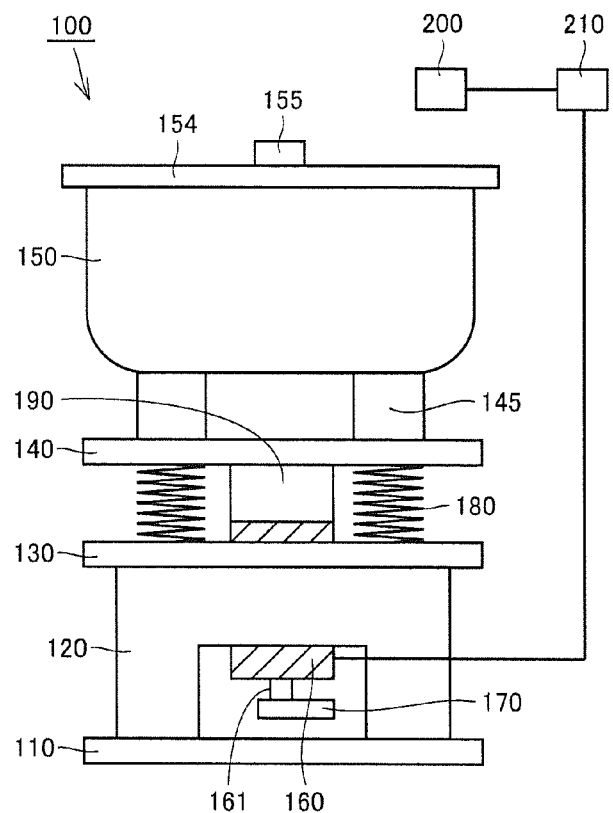
FIG. 11 is a diagram illustrating a surface treatment apparatus for performing surface treatment of a base electrode layer illustrated in FIG. 10.
Figure 12:
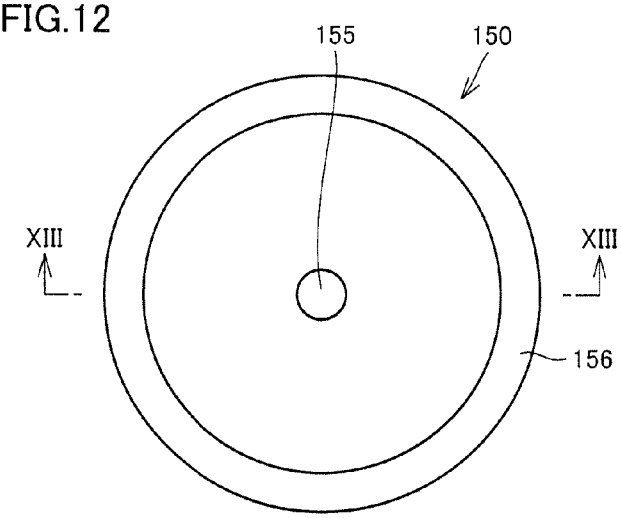
FIG. 12 is a plan view of a stirring tank illustrated in FIG. 11.
Figure 13:
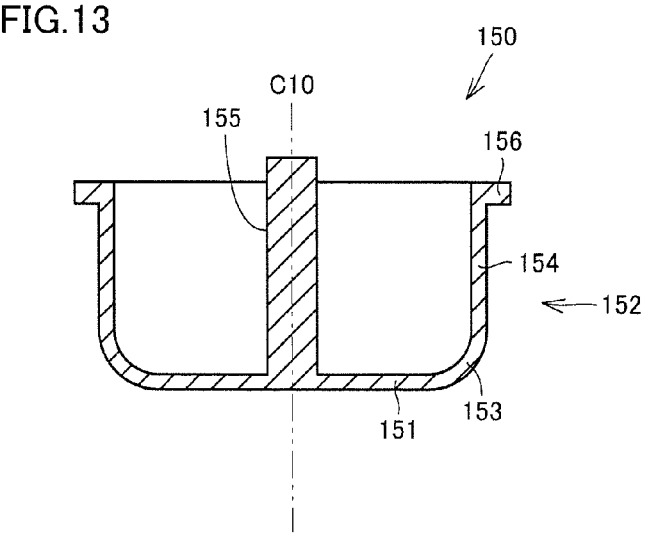
FIG. 13 is a cross-sectional view of the stirring tank illustrated in FIG. 11.
Figure 14:
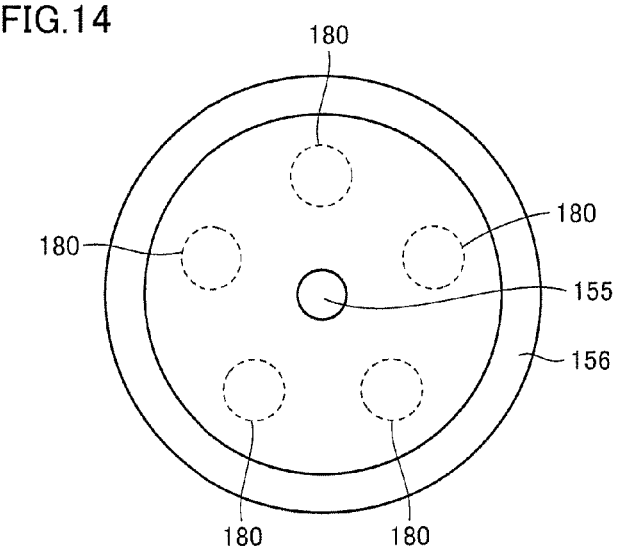
FIG. 14 is a plan view illustrating a positional relationship between the stirring tank and elastic members illustrated in FIG. 11.

FIG. 11 is a diagram illustrating a surface treatment apparatus for performing the surface treatment of the base electrode layer illustrated in FIG. 10. FIG. 12 is a plan view of the stirring tank illustrated in FIG. 11. FIG. 13 is a cross-sectional view of the stirring tank illustrated in FIG. 11. FIG. 14 is a plan view illustrating a positional relationship between the stirring tank and elastic members illustrated in FIG. 11. Referring to FIGS. 11 to 14, the surface treatment apparatus 100 used in step S13A will be described.

As illustrated in FIG. 11, the surface treatment apparatus 100 includes a first base portion 110, a second base portion 120, a third base portion 130, a vibration receiving plate 140, the stirring tank 150 defining and functioning as a container, a drive motor 160, an eccentric load 170, a plurality of elastic members 180, a drive motor support portion 190, a detection portion 200 to detect a vibration state of the stirring tank 150, and a drive motor control portion 210.

The first base portion 110 preferably has a plate shape. The first base portion 110 defines a lower portion of the surface treatment apparatus 100. The first base portion 110 is disposed on the floor surface, and maintains the horizontality of the surface treatment apparatus 100.

The second base portion 120 has a rectangular or substantially rectangular parallelepiped shape. The second base portion 120 defines and functions as a pedestal to support a load of the vibration receiving plate 140, the stirring tank 150, and the drive motor 160, and the eccentric load 170 supported by the vibration receiving plate 140. The second base portion 120 is structured such that the drive motor 160 passes therethrough.

The third base portion 130 preferably has a plate shape. The third base portion 130 is disposed on the second base portion 120. The third base portion 130 is structured such that the drive motor 160 passes therethrough.

The first base portion 110, the second base portion 120, and the third base portion 130 may be independently defined by separate members or may be integrally provided.

The vibration receiving plate 140 preferably has a plate or substantially plate shape. The vibration receiving plate 140 is supported by the plurality of elastic members 180. The drive motor support portion 190 is provided on a lower surface side of the vibration receiving plate 140. The drive motor support portion 190 supports the drive motor 160 to which the eccentric load 170 is rotatably attached. With this configuration, the load due to the drive motor 160 and the eccentric load 170 is applied to the vibration receiving plate 140 with the drive motor support portion 190 interposed therebetween.

Further, a stirring tank placing portion 145 is provided on an upper surface side of the vibration receiving plate 140. The stirring tank 150 is disposed on the stirring tank placing portion 145.

As illustrated in FIG. 11 to FIG. 13, the stirring tank 150 preferably has a bottomed cylindrical or substantially cylindrical shape. Note that the stirring tank 150 includes a bottom portion 151, a peripheral wall portion 152, a shaft portion 155, and a flange portion 156.

The bottom portion 151 preferably has a disk or substantially disk shape. The bottom portion 151 is flat. Note that the bottom portion 151 does not have to be flat. The peripheral wall portion 152 is connected to a peripheral edge of the bottom portion 151. The peripheral wall portion 152 rises upward from the peripheral edge of the bottom portion 151. The peripheral wall portion 152 includes a curved portion 153 connected to the bottom portion 151 and a cylindrical portion 154 extending linearly along an up-down direction. The flange portion 156 which protrudes in a radial direction is provided at an upper end of the cylindrical portion 154.

The shaft portion 155 is provided at a center or approximate portion of the bottom portion 151. The shaft portion 155 extends along the up-down direction. Note that the shaft portion 155 needs not to be provided.

Further, the shape of the stirring tank 150 is not limited to the bottomed cylindrical shape, and may be a hemispherical shape or a bowl shape, for example. When the stirring tank 150 has the hemispherical shape, the bottom portion 151 defines a lower side of the hemispherical shape, and the peripheral wall portion 152 defines an upper side of the hemispherical shape. Further, when the stirring tank 150 has the bowl shape, the bottom portion 151 has a curved shape bulging toward the lower side.

Note that as will be described later, a plurality of multilayer chips on each of which the base electrode layer is provided and a plurality of media are fed into the stirring tank 150.

Preferably, the inner surface of the stirring tank 150 is provided with a coating layer of a flexible material, such as urethane or other suitable material, for example. In particular, when a large multilayer chip having a length dimension of more than about 2.0 mm, a width dimension of more than about 1.2 mm, and a height dimension of more than about 1.2 mm is handled, it is preferable to use a member with elasticity, such as rubber or other suitable material, for example, as the coating layer because there is a risk of chipping and breaking of the multilayer chip.

On the other hand, when a small multilayer chip having a length dimension of about 2.0 mm or less, a width dimension of about 1.2 mm or less, and a height dimension of about 1.2 mm or less is handled, the coating layer may be omitted because there is little risk of breaking and chipping.

Preferably, the stirring tank 150 is detachably disposed on the stirring tank placing portion 145. When the small multilayer chip as described above is handled, by detaching the stirring tank 150, it is possible to wash the inside of the stirring tank 150. In this manner, it is possible to prevent mixing of the chips.

Note that the stirring tank 150, the stirring tank placing portion 145, and the vibration receiving plate 140 may be defined as separate bodies or integrally provided.

As illustrated in FIGS. 11 and 14, the plurality of elastic members 180 are disposed at a predetermined pitch in the circumferential direction around the shaft portion 155 as the center or approximate center when viewed from the extending direction of the shaft portion 155. The plurality of elastic members 180 are fixed on the third base portion 130.

As illustrated in FIG. 11, the drive motor 160 includes a rotation shaft 161 which extends in the up-down direction. The drive motor 160 rotates the rotation shaft 161 to rotate the eccentric load 170 attached to the rotation shaft 161 around the rotation shaft.

By rotating the eccentric load 170, the position of the center of gravity of the vibration receiving plate 140 fluctuates, and thus, the plurality of elastic members 180 biasedly expand and contract. By utilizing the biased expansion and contraction of the plurality of elastic members 180, it is possible to vibrate the stirring tank 150 as described above.

The detection portion 200 detects a vibration state of the stirring tank 150. A detection result detected by the detection portion 200 is input to the drive motor control portion 210. As the detection portion 200, for example, an acceleration sensor or a laser displacement meter is preferably used.

In a case in which the acceleration sensor is used as the detection portion 200, it is possible to detect the vibration state of the stirring tank 150 by directly measuring the acceleration of the medium during the vibration. As the acceleration sensor, for example, GH313A or GH613 (both manufactured by KEYENCE CORPORATION) may be used as a sensor head, and GA-245 (manufactured by KEYENCE CORPORATION) may be used as an amplifier.

As the acceleration of the medium, equal to or more than about 2.5 G and equal to or less than about 20.0 G, for example, is preferable. In a case in which the acceleration of the medium is less than about 2.5 G, sufficient energy for extending the metal included in the base electrode layer cannot be obtained. On the other hand, in a case in which the acceleration of the medium is more than about 10.0 G, damage to the multilayer chip increases.

In a case in which the laser displacement meter is used as the detection portion 200, it is possible to detect the vibration state of the stirring tank 150 by irradiating the stirring tank 150 with a laser beam and measuring a movement amount of the stirring tank 150.

As described above, by measuring the acceleration of the medium or the movement amount of the stirring tank 150, it is possible to detect the vibration state of the stirring tank 150, and more particularly, a vibration frequency of the stirring tank 150.

The drive motor control portion 210 controls an operation of the drive motor 160 based on the detection result detected by the detection portion 200.

Figure 15:
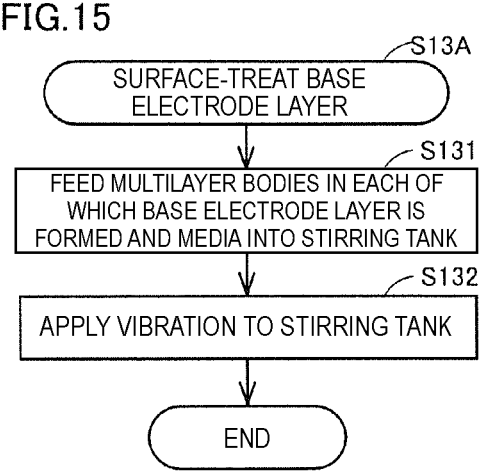
FIG. 15 is a flowchart illustrating steps of performing the surface treatment of the base electrode layer illustrated in FIG. 10 in detail.

FIG. 15 is a flowchart illustrating steps of performing the surface treatment of the base electrode layer illustrated in FIG. 10 in detail. Referring to FIG. 15, step S13A of performing surface treatment of the base electrode layer will be described in detail.

As illustrated in FIG. 15, in step S13A of performing the surface treatment of the base electrode layer, first, in step S131, a plurality of the ceramic element bodies 10 each including the first end surface 10e and the second end surface 10f which face each other, the first side surface 10c and the second side surface 10d which face each other, and the first main surface 10a and the second main surface 10b which face each other, and in each of which at least one or more base electrode layers are provided on each of the first side surface 10c, the second side surface 10d, the first end surface 10e, and the second end surface 10f, and a plurality of media (not illustrated) are fed into the stirring tank 150.

The media each preferably has a spherical or substantially spherical shape. Preferably, a diameter of each of the media is smaller than a length of the diagonal line of the first end surface 10e and the second end surface 10f. By using such a diameter, it is possible to easily isolate the media and the ceramic element bodies 10 using a mesh screen.

Specifically, the diameter of each of the media is preferably, for example, equal to or more than about 0.2 mm and equal to or less than about 2.0 mm, and more preferably equal to or more than about 0.4 mm and equal to or less than about 1.0 mm.

As a material of the medium, for example, tungsten (which may be a super-steel including cobalt or chromium) or zirconium may preferably be used. A surface of the medium is preferably smooth, and a surface roughness Sa of the medium is preferably equal to or less than about 200 μm, for example.

It is preferable that a specific gravity of the medium is, for example, equal to or more than about 5 and equal to or less than about 18. If the specific gravity is too small, kinetic energy of the medium decreases, and the metal exposed on the surface layer of the base electrode layer cannot be sufficiently extended. On the other hand, if the specific gravity is too large, damage to the ceramic element body is caused.

It is preferable that the hardness of the medium is, for example, equal to or higher than about 1000 HV and equal to or lower than about 2500 HV in the Vickers hardness. If the hardness is too low, the medium will break. If the hardness is too high, damage to the ceramic element body may be caused.

In addition, the total volume of the plurality of ceramic element bodies 10 fed into the stirring tank 150 is, for example, preferably equal to or less than about ½, and more preferably equal to or less than about ⅓, of the total volume of the plurality of media fed into the stirring tank 150. If the amount of the plurality of ceramic element bodies 10 with respect to the plurality of media is excessively increased, the processability by the media is deteriorated, and cracks are generated in the corner portions of the ceramic element body 10, or the ceramic element body 10 is chipped or broken.

Next, in step S132, the stirring tank 150 is vibrated. With this, vibration energy is applied to the plurality of ceramic element bodies 10 and the plurality of media. Specifically, the stirring tank 150 is vibrated using the surface treatment apparatus 100 described above.

Figure 16:
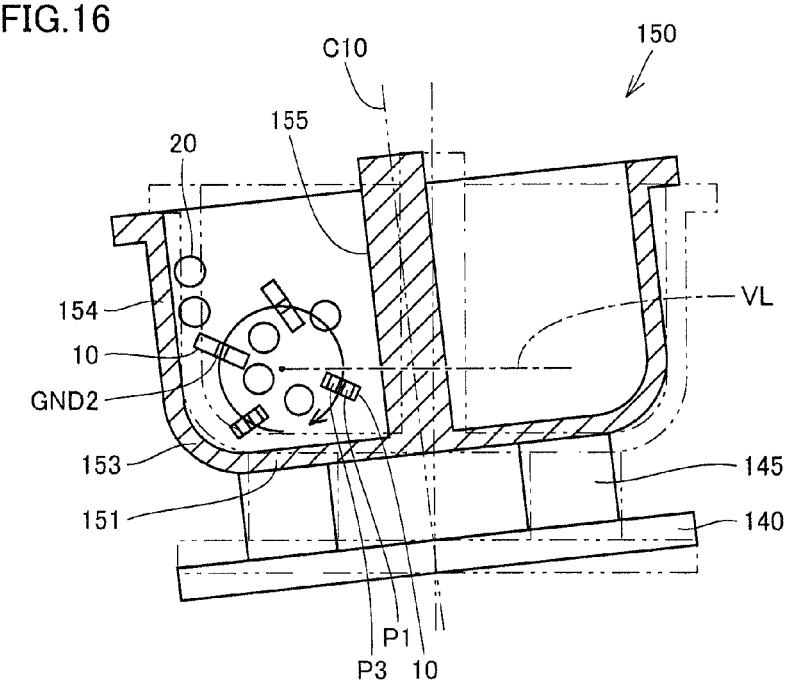
FIG. 16 is a diagram illustrating a step of applying vibration energy to a plurality of ceramic element bodies and a plurality of media in a step of applying vibration to the stirring tank illustrated in FIG. 15.

FIG. 16 is a diagram illustrating a step of applying the vibration energy to the plurality of ceramic element bodies and the plurality of media in a step of applying vibration to the stirring tank illustrated in FIG. 15. As illustrated in FIG. 16, in the surface treatment apparatus 100, by rotating the eccentric load 170, the position of the center of gravity of the drive motor 160 and the vibration receiving plate 140 shifts. With this, the vibration receiving plate 140 is inclined, and the plurality of elastic members 180 respectively biasedly expand and contract. Further, by the vibration receiving plate 140 being inclined, a central axis C10 of the bottom portion 151 of the stirring tank 150 is also inclined.

Due to the position of the eccentric load 170 changing continuously with the rotation, the inclination of the vibration receiving plate 140 changes according to the position of the eccentric load 170. As a result, the position of largely biased expansion and contraction of the elastic member 180 is also moved in the circumferential direction. As described above, vibration is propagated from the plurality of elastic members 180 to the stirring tank 150 such that the inclination direction of the central axis C10 of the bottom portion 151 is continuously changed by the expansion and contraction of the plurality of elastic members 180.

Due to the inclination direction of the central axis C10 of the bottom portion 151 also changing continuously, in a case in which an imaginary axis VL having an annular shape surrounding the central axis C10 of the bottom portion 151 in a circumferential direction in a state before vibrating the stirring tank 150 is imagined, such that the ceramic element bodies 10 and the media 20 draw a spiral locus spirally surrounding the imaginary axis VL along an axial direction of the imaginary axis VL, the vibration is applied to the ceramic element bodies 10 and the media.

The vibration of the stirring tank 150 is transmitted to the plurality of ceramic element bodies and the plurality of media fed into the stirring tank 150, such that the plurality of ceramic element bodies and the plurality of media are stirred while being spirally rotated. With this, while the media extend the surface layer of the base electrode layer, the glass included in the surface layer of the base electrode layer is reduced. As a result, a state of the surface layer of the base electrode layer is reformed to form the above-described second region 15a2 having a smooth surface with high metal denseness, and the first region 15a1 is formed between the second region 15a2 and the ceramic element body 10.

The second region 15a2 includes the buffer portion of equal to or more than about 1 vol % and equal to or less than about 10 vol %, and the first region 15a1 includes the buffer portion of equal to or more than about 15 vol % and equal to or less than about 50 vol %.

Further, although the inclination direction of the stirring tank 150 changes in the circumferential direction, since the stirring tank 150 itself does not rotate around the central axis C10, even when the ceramic element body is brought into contact with the stirring tank 150, an excessive force is not applied from the stirring tank 150 to the ceramic element body. Thus, breaking and chipping of the ceramic element body are reduced or prevented.

In the stirring tank 150, as the distance from the shaft portion 155 in the radial direction is increased, the vibration is largely transmitted to the ceramic element bodies and the media fed into the stirring tank 150. Further, since the bottom portion 151 is inclined and the shaft portion 155 is also inclined, the closer the shaft portion 155 is to any one of the plurality of elastic members 180, the more easily the vibration from the elastic member 180 to which the shaft portion is close is received.

Therefore, by providing a structure in which the plurality of ceramic element bodies and the plurality of media are retained at a position distanced from the shaft portion 155 in the radial direction in the stirring tank 150, it is possible to effectively transmit the vibration to the plurality of ceramic element bodies and the plurality of media. Thus, the surface treatment of the base electrode layer is able to be performed more efficiently.

Further, it is preferable to vibrate the stirring tank 150 such that the vibration frequency of the stirring tank 150 resonates with the natural frequency of the stirring tank 150. A natural frequency is a vibration frequency at which vibration intensity becomes high, that is, machining energy becomes high. By vibrating the stirring tank 150 such that the vibration frequency of the stirring tank 150 becomes the natural frequency, it is possible to efficiently perform the surface treatment of the base electrode layer.

The vibration frequency of the stirring tank 150 may be adjusted, for example, by changing a speed at which the eccentric load 170 is rotated by the drive motor 160. By performing such adjustment, the vibration state of the stirring tank 150 is detected by the detection portion 200.

In a case in which the detection portion 200 detects that the vibration frequency of the stirring tank 150 deviates from the natural frequency, the drive motor control portion 210 controls the operation of the drive motor 160 such that the vibration frequency of the stirring tank 150 approaches the natural frequency of the stirring tank 150.

Next, in step S14, a plating layer is formed on the base electrode layer 15a including the first region 15a1 and the second region 15a2. Ni plating and Sn plating, for example are preferably applied in this order on the second region 15a2, thus forming the first plating layer 15b and the second plating layer 15c. As a result, a plurality of outer electrodes are formed on the outer surface of the ceramic element body 10.

Through the above-described series of steps, the electronic component 1 is manufactured.

As described above, the second manufacturing method for the electronic component according to the first preferred embodiment includes preparing the multilayer chip including glass; applying the conductive paste including the buffer portion forming member for forming the buffer portion to buffer the external impact onto the multilayer chip; forming the base electrode layer on the ceramic element body by firing the conductive paste; and surface-treating the base electrode layer, in which in the surface-treating of the base electrode layer, in the base electrode layer, the first region that is disposed on the ceramic element body and includes the buffer portion of equal to or more than about 15 vol % and equal to or less than about 50 vol %, and the second region that covers the first region and includes the buffer portion of equal to or more than about 1 vol % and equal to or less than about 10 vol % are formed.

As a result, it is possible to form a dense metal film layer on the surface layer side of the base electrode layer 15a while forming the first region 15a1 having an appropriate cushioning property inside the base electrode layer 15a in the manufactured electronic component. As a result, by using the second manufacturing method for the electronic component, it is possible to manufacture the electronic component which has excellent impact resistance. In addition, it is possible to manufacture the electronic component capable of reducing or preventing penetration of the plating.

Further, the surface-treating of the base electrode layer includes feeding the plurality of ceramic element bodies 10 each provided with the base electrode layer 15a and the plurality of media into the container and vibrating the stirring tank 150. In the vibrating of the stirring tank 150, the vibration energy is applied to the plurality of ceramic element bodies 10 and the plurality of media.

Specifically, in the vibrating of the stirring tank 150, the vibration is applied to the ceramic element bodies 10 and the media 20 such that the ceramic element bodies 10 and the media 20 draw the spiral locus spirally surrounding the imaginary axis VL along the axial direction of the imaginary axis VL. As described above, in the present preferred embodiment, as compared with a sand blast method in which a basket is rotated around an axis while polishing powder is blown onto the ceramic element body, the stirring tank 150 is not rotated around the central axis C10 of the bottom portion. Therefore, even in a case in which the plurality of ceramic element bodies 10 come into contact with the stirring tank 150, it is possible to reduce or prevent an excessive force from being applied from the stirring tank 150 to the ceramic element body. As a result, breaking and chipping of the ceramic element body are reduced or prevented.

Further, by applying the vibration energy to the plurality of ceramic element bodies 10 and the plurality of media, the ceramic element bodies each provided with the base electrode layer 15a and the media are stirred, and the surface layer of the base electrode layer is polished while rubbing the surface layer of the base electrode layer 15a with the media.

Thus, the voids and the glass included in the surface layer of the base electrode layer 15a are reduced, and the metal included in the base electrode layer 15a is extended and the surface layer of the base electrode layer 15a is flattened. As a result, the surface of the base electrode layer 15a becomes smooth, and the denseness of the metal is increased on the surface layer side of the base electrode layer 15a, and thus the surface of the base electrode layer 15a is able to be reformed.

Second Preferred Embodiment

FIG. 17 is a schematic diagram illustrating a configuration of an electronic component according to a second preferred embodiment of the present invention. FIG. 18 is a circuit diagram illustrating the configuration of the electronic component according to the second preferred embodiment. Referring to FIG. 17 and FIG. 18, an electronic component 1A according to the second preferred embodiment will be described.

As illustrated in FIG. 17 and FIG. 18, the electronic component 1A according to the second preferred embodiment is different from the electronic component according to the first preferred embodiment, when comparing both of the first preferred embodiment and the second preferred embodiment, in an internal configuration of the ceramic element body 10. Other configurations are the same or substantially the same as those of the first preferred embodiment.

In the electronic component 1A, an inductor element L5, a capacitor element C5, a wiring pattern 28, and an ESD protection portion Dg are provided inside the ceramic element body 10. Outer electrodes P1, P2, and GND are provided on the second main surface 10b of the ceramic element body 10. The outer electrodes P1, P2, and GND extend from the second main surface 10b to the first side surface 10c and the second side surface 10d.

The inductor element L5 is provided in an upper portion 10x of the ceramic element body 10, and the capacitor element C5 is provided in a lower portion 10y of the ceramic element body 10. A low pass filter is defined by the inductor element L5 and the capacitor element C5. In other words, the electronic component 1A is a low pass filter including an ESD protection function.

Each of the outer electrodes P1, P2, and GND according to the second preferred embodiment has the same or substantially the same configuration as those of the outer electrodes according to the first preferred embodiment, and includes the first region 15a1 that is positioned on the ceramic element body 10 and preferably includes, for example, the buffer portion of equal to or more than about 15 vol % and equal to or less than about 50 vol %, and the second region 15a2 that covers the first region 15a1 and includes the buffer portion of equal to or more than about 1 vol % and equal to or less than about 10 vol %.

As described above, with the electronic component 1A according to the second preferred embodiment, when an external force is applied from the side of the second main surface 10b, since the first region 15a1 has a cushioning property, it is possible to improve impact resistance. In addition, penetration of the plating is reduced or prevented by the second region 15a2 including the dense metal film.

The electronic component 1A according to the second preferred embodiment may be manufactured in accordance with any one of the first manufacturing method and the second manufacturing method according to the first preferred embodiment.

First, a case of manufacturing in accordance with the first manufacturing method according to the first preferred embodiment will be described. In this case, in the same or substantially the same manner as in step S10 in the first manufacturing method according to the first preferred embodiment, the green sheet is prepared, and the through-hole is filled with the electrode paste defining and functioning as the conductor pattern, or the electrode paste is applied onto the green sheet, so as to correspond to the inductor element L5 and the capacitor element C5 on the green sheet. Further, the paste for the shield layers Sh11 and Sh21, the electrode paste for the discharge electrode, the resin paste, and the paste for the shield layer Sh21 are applied onto the green sheet so as to form the ESD protection portion Dg. These green sheets are stacked and subjected to pressure bonding. With this, a multilayer block in which the plurality of green sheets are stacked and subjected to pressure bonding is formed. In the same or similar manner as the first manufacturing method according to the first preferred embodiment, the multilayer block is divided into individual pieces, thus forming the multilayer chip as the element body portion.

Next, in the same or substantially the same manner as in the first manufacturing method according to the first preferred embodiment, steps S11 to S14 are performed to manufacture the electronic component 1A. At this time, in step S11, the first conductive paste is applied onto the second main surface 10b at three positions spaced apart from one another along the length direction L. In the same or similar manner, at step S12, the second conductive paste is applied. Through the above-described series of steps, the electronic component 1A is manufactured.

Next, a case of manufacturing in accordance with the second manufacturing method according to the first preferred embodiment will be described. In this case, as described above, the multilayer chip is prepared.

Next, in the same or substantially the same manner as in the second manufacturing method according to the first preferred embodiment, steps S11A to S14 are performed to manufacture the electronic component 1A. At this time, in step S11A, the conductive paste is applied onto the second main surface 10b at three positions spaced apart from one another along the length direction L.

By manufacturing the electronic component using the manufacturing method as described above, it is possible to manufacture the electronic component having the improved impact resistance as in the first preferred embodiment.

FIG. 19 is a table showing in detail a conductive paste used in a first verification experiment and a second verification experiment performed to verify the advantageous effects of the preferred embodiments. FIG. 20 is a table showing conditions and results of the first verification experiment performed to verify the advantageous effects of the preferred embodiments. FIG. 21 is a table showing conditions and results of the second verification experiment performed to verify the advantageous effects of the preferred embodiments. Referring to FIG. 19 to FIG. 21, the first verification experiment and the second verification experiment performed to verify the advantageous effects of the preferred embodiments will be described.

As shown in FIG. 19, various conductive pastes of P-1 to P-6 were prepared and used in the first verification experiment and the second verification experiment. In each of the various conductive pastes P-1 to P-6, copper powder as a conductive particle, a resin bead as the buffer portion forming member, and a varnish as a binder were mixed in a volume ratio as shown in FIG. 19. Note that as the copper powder, 1100Y-2 (manufactured by MITSUI MINING & SMELTING CO., LTD.) having a central particle diameter of about 1.1 µm, a specific surface area of about 0.64 m$^2$/g, and a tapping density of about 4.6 g/ml was used. As the resin bead, PPW-5 (manufactured by SEISHIN ENTERPRISE Co., Ltd.) having a particle diameter D50 of about 5.01 µm and a particle diameter D100 of about 13.98 µm was used.

In the first verification experiment, as shown in FIG. 20, electronic components according to working examples K-1 to K-20 were manufactured. When manufacturing each of the electronic components according to K-1 to K-20, for K-1 to K-3, K-5 to K-8, K-10 to K-14, and K-16 to K-20, the first manufacturing method according to the first preferred embodiment was used. For K-4, K-9, and K-15, in the first manufacturing method, Cu plating was applied on the base electrode layer in place of the step of applying the second conductive paste, thus forming the second region. More specifically, after the first conductive paste was applied and fired, the Cu plating was performed. Thereafter, the first plating layer (Ni plating) and the second plating layer (Sn plating) were formed on the Cu plating layer, such that the outer electrode was formed.

Conductive pastes used as the first conductive paste in K-1 to K-20 and conductive pastes used as the second conductive paste in K-1 to K-3, K-5 to K-8, K-10 to K-14, and K-16 to K-20 were as shown in FIG. 20. In K-4, K-9, and K-15, the Cu plating was used in place of the second conductive paste.

In each of the electronic components according to K-1 to K-20, the ratio of the buffer portion included in each of the first region 15a1 and the second region 15a2 described above, the thickness of the first region 15a1, and the thickness of the second region 15a2 were as shown in FIG. 20. The buffer portion was defined by only a void.

In the second verification experiment, as shown in FIG. 21, electronic components according to working examples K-21 to K-29 were manufactured. When manufacturing each of the electronic components according to K-21 to K-29, for K-21, K-22, K-24, K-25, K-27, and K-28, the second manufacturing method according to the first preferred embodiment was used. For K-23, K-26, and K-29, the first manufacturing method according to the first preferred embodiment was used.

The conductive paste used for K-21, K-22, K-24, K-25, K-27, and K-28, and the first conductive paste and the second conductive paste used for K-23, K-26, and K-29 were as shown in FIG. 21.

In each of the electronic components according to K-21 to K-29, the ratio of the buffer portion included in each of the first region 15a1 and the second region 15a2 described above, the thickness of the first region 15a1, and the thickness of the second region 15a2 were as shown in FIG. 21. The buffer portion was defined by only a void.

In both of the first verification experiment and the second verification experiment, a drop test was performed and a deposition degree of the Ni plating into the second region and the first region was observed. In other words, for each of the electronic components according to K-1 to K-29, the drop test was performed, and the deposition degree of the Ni plating into the second region and the first region was observed.

In the drop test, it was confirmed whether or not a crack was formed after dropping a mounting substrate, on which the electronic component was soldered and mounted by reflow at about 260° C. on a printed circuit board, 10 times from a position of about 180 cm in height. At this time, the mounting substrate after being dropped 10 times was impregnated with a red checker solution, and was observed under a stereomicroscope at a magnification of 10×. Electronic components in which a crack having a length of equal to or more than about 100 μm was observed were judged as poor, and electronic components in which a crack having a length of equal to or more than about 100 μm was not observed were judged as fair. Further, after dropping 10 times from a position of about 200 cm in height, observation was performed in the same manner as described above, electronic components in which a crack having a length of equal to or more than about 100 μm was not observed were judged as good.

In the observation of the deposition degree of the Ni plating, electronic components in which the Ni plating deposition was confirmed in an area on the inner side (on the ceramic element body 10 side) than a position of about 30% of the total thickness of the first region 15a1 and the second region 15a2 from the surface layer side of the second region 15a2 were judged as poor. Electronic components in which the Ni plating deposition was confirmed in an area between the position of about 30% of the total thickness of the first region 15a1 and the second region 15a2 from the surface layer side of the second region 15a2 and a position of about 20% of the above-described total thickness from the above-described surface layer side were judged as fair. Electronic components in which the Ni plating deposition was retained in an area between the position of about 20% of the total thickness of the first region 15a1 and the second region 15a2 from the surface layer side of the second region 15a2 and the surface layer, or the one in which the Ni plating deposition was not confirmed were judged as good.

For the electronic components according to K-1 to K-29, the results of the drop test performed thereon and the observation results of the deposition degree of the Ni plating into the second region and the first region were as shown in FIG. 20 and FIG. 21.

From the results of the first verification experiment and the second verification experiment, it was confirmed that the base electrode layer included the first region 15a1 which was positioned on the ceramic element body 10 and included the buffer portion of equal to or more than about 15 vol % and equal to or less than about 50 vol % and the second region 15a2 which covered the first region 15a1 and included the buffer portion of equal to or more than about 1 vol % and equal to or less than about 10 vol %, such that the impact resistance was improved.

Further, it was confirmed that, by setting the content of the buffer portion of the first region 15a1 to be equal to or more than about 15 vol % and equal to or less than about 50 vol % and the content of the buffer portion of the second region 15a2 to equal to or more than about 1 vol % and equal to or less than about 10 vol %, in addition to the improvement of the impact resistance, reduction or prevention of the penetration of the plating into the base electrode layer was achieved.

In addition, it was confirmed that, in the contents of the buffer portions, by setting the thickness of the first region 15a1 to be equal to or more than about 3 μm and equal to or less than about 40 μm and the thickness of the second region 15a2 to equal to or more than about 0.5 μm and equal to or less than about 15 μm, in addition to the improvement of the impact resistance, the reduction or prevention of the penetration of the plating into the base electrode layer and the like was more reliably achieved.

Further, it was confirmed that, by setting the thickness of the first region 15a1 to be equal to or more than about 5 μm and equal to or less than about 40 μm and the thickness of the second region 15a2 to be equal to or more than about 1 μm and equal to or less than about 15 μm, in addition to the improvement of the impact resistance, the reduction or prevention of the penetration of the plating into the base electrode layer was more effectively achieved.

In addition, it was confirmed that, even in a case in which the electronic component was manufactured using any manufacturing method of the first manufacturing method and the second manufacturing method according to the first preferred embodiment described above, by forming the outer electrode including the base electrode layer including the first region and the second region having the buffer portion of the ratio as described above, the electronic component with improved impact resistance was able to be manufactured.

Note that the mark "*" shown in FIG. 20 means that the working example is out of the scope of preferred embodiments of the present invention.

In the first and second preferred embodiments described above, the case in which the buffer portions included in the first region 15a1 and the second region 15a2 of the base electrode layer each include both of the void and the glass has been described as an example, but the configuration is not limited thereto, and the buffer portion may include at least one of the void and the glass. In other words, in the first and second preferred embodiments described above, the case in which the first conductive paste and the second conductive paste in the first manufacturing method and the conductive paste in the second manufacturing method include both of the resin beads and the glass as the buffer portion forming member has been described as an example, but the paste is not limited thereto, and it is sufficient that at least one of the resin beads and the glass is included.

In the first and second preferred embodiments described above, the case in which, in the first manufacturing method, as the element body portion, the multilayer chip is prepared, the first conductive paste is applied to the multilayer chip and then the second conductive paste is applied thereto, and thereafter the multilayer chip, the first conductive paste, and the second conductive paste are fired has been described as an example, but the method is not limited thereto. For example, the ceramic element body 10 that is in a state after firing the multilayer chip may be prepared as the element body portion. In this case, after the first conductive paste is applied to the ceramic element body 10 and the second conductive paste is applied onto the first conductive paste, the ceramic element body to which the first conductive paste and the second conductive paste have been applied is fired. Through this, the base electrode layer including the first region 15a1 and the second region 15a2 is formed on the ceramic element body 10.

In the first and second preferred embodiments described above, the case in which, in the second manufacturing method, as the element body portion, the multilayer chip is prepared, the conductive paste is applied to the multilayer chip, and thereafter the multilayer chip and the conductive paste are fired has been described as an example, but the method is not limited thereto. For example, the ceramic element body 10 that is in a state after firing the multilayer chip may be prepared as the element body portion. In this case, after the conductive paste is applied to the ceramic element body 10, the ceramic element body 10 to which the conductive paste has been applied is fired. Through this, the base electrode layer is formed on the ceramic element body 10.

In the second manufacturing method in the first and second preferred embodiments described above, the case in which the surface treatment of the base electrode layer 15a is performed using the surface treatment apparatus 100 described above as the step of performing the surface treatment has been described as an example, but the method is not limited thereto, and the surface treatment may be performed using a sand blast method or a normal barrel polishing apparatus, for example. When the base electrode layer 15a is polished using the surface treatment apparatus 100 described above, it is possible to reduce or prevent an excessive force from being applied from the stirring tank 150 to the ceramic element body, and to reduce or prevent breaking and chipping of the ceramic element body 10 as described above.

In the first and second preferred embodiments described above, the case in which the electronic component is a choke coil or a low-pass filter has been described as an example, but the electronic component is not limited thereto, and may be a multilayer ceramic capacitor including a plurality of dielectric layers and a plurality of internal electrode layers that are laminated.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electronic component comprising:
a ceramic element body including glass; and
a plurality of outer electrodes provided on the ceramic element body; wherein
each of the plurality of outer electrodes includes a base electrode layer that is provided on the ceramic element body and includes a buffer portion to buffer an impact; and
the base electrode layer includes a first region that is disposed on the ceramic element body and includes the buffer portion of equal to or more than about 15 vol % and equal to or less than about 50 vol % in a volume of the first region, and a second region that covers the first region and includes the buffer portion of equal to or more than about 1 vol % and equal to or less than about 10 vol % in a volume of the second region.

2. The electronic component according to claim 1, wherein
a thickness of the first region is equal to or more than about 5 μm and equal to or less than about 40 μm; and
a thickness of the second region is equal to or more than about 1 μm and equal to or less than about 15 μm.

3. The electronic component according to claim 1, wherein
the ceramic element body includes a first end surface and a second end surface that face each other in a length direction, a first side surface and a second side surface that face each other in a width direction orthogonal or substantially orthogonal to the length direction, and a first main surface and a second main surface that face each other in a height direction orthogonal or substantially orthogonal to the length direction and the width direction;
at least one or more of the outer electrodes are provided on each of the first side surface, the second side surface, the first end surface, and the second end surface, and
two or more of the plurality of outer electrodes are provided on at least one of the first side surface, the second side surface, the first end surface, and the second end surface.

4. The electronic component according to claim 1, further comprising:
a hollow cavity portion provided in the ceramic element body; and
a pair of discharge electrodes that oppose each other in the hollow cavity portion.

5. The electronic component according to claim 1, wherein the buffer portion is a void.

6. The electronic component according to claim 1, wherein the ceramic element body includes a plurality of dielectric layers and a plurality of conductor patterns which are alternately laminated along a lamination direction.

7. The electronic component according to claim 6, wherein the plurality of dielectric layers are made of a low-temperature sintered ceramic material including BaO—$Al_2O_3$—$SiO_2$ as a main component.

8. The electronic component according to claim 6, wherein the conductor patterns are made of a Ni, Cu, Ag, Pd, an Ag—Pd alloy, or Au.

* * * * *